US010054777B2

(12) United States Patent
Wallace et al.

(10) Patent No.: US 10,054,777 B2
(45) Date of Patent: Aug. 21, 2018

(54) COMMON-MODE DIGITAL HOLOGRAPHIC MICROSCOPE

(71) Applicant: California Institute of Technology, Pasadena, CA (US)

(72) Inventors: James K. Wallace, Pasadena, CA (US); Kurt M. Liewer, Pasadena, CA (US); Christian A. Lindensmith, Altadena, CA (US); Eugene Serabyn, Claremont, CA (US); Stephanie Rider, Monrovia, CA (US); Emilio C. Graff, Burlingame, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 14/939,389

(22) Filed: Nov. 12, 2015

(65) Prior Publication Data

US 2016/0131882 A1    May 12, 2016

Related U.S. Application Data

(60) Provisional application No. 62/078,288, filed on Nov. 11, 2014, provisional application No. 62/079,342, filed on Nov. 13, 2014.

(51) Int. Cl.
*G02B 21/00* (2006.01)
*G03H 1/04* (2006.01)
*G02B 21/18* (2006.01)
*G03H 1/00* (2006.01)

(52) U.S. Cl.
CPC ....... *G02B 21/0056* (2013.01); *G02B 21/008* (2013.01); *G02B 21/0008* (2013.01);
(Continued)

(58) Field of Classification Search
CPC ........... G02B 21/0056; G02B 21/18; G02B 21/0072; G02B 21/0008; G02B 21/008;
(Continued)

(56) References Cited

U.S. PATENT DOCUMENTS 3,580,655 A * 5/1971 Leith ................ G01B 9/021
355/2
3,756,683 A * 9/1973 Smith, Jr. ............ G03H 1/08
359/29
(Continued)

FOREIGN PATENT DOCUMENTS

WO    WO 2007108060 A1 *    9/2007    ......... G01B 11/2441

OTHER PUBLICATIONS

"Optics and Lasers—An engineering Physics approach" to M. Young, Springer Verlag Ed. 1977 (p. 118).*
(Continued)

*Primary Examiner* — Mohamed K Amara
(74) *Attorney, Agent, or Firm* — Gates & Cooper LLP

(57) ABSTRACT

A lens-less digital holographic microscope, a reflective digital holographic microscope, and a digital holographic microscope including a plurality of lenses. In one example, the digital holographic microscope includes a single mode fiber collimated light source which provides illumination for both the 'science' and 'reference' arms, a pair of microscope objectives located side-by side, and illuminated by the common beam, a relay lens whose center is between the two objectives, and a focal plane element where the interference pattern is measured.

21 Claims, 13 Drawing Sheets

(52) U.S. Cl.
CPC ......... *G02B 21/0072* (2013.01); *G02B 21/18* (2013.01); *G03H 1/0443* (2013.01); *G03H 2001/005* (2013.01); *G03H 2001/0445* (2013.01); *G03H 2222/12* (2013.01); *G03H 2222/13* (2013.01); *G03H 2227/02* (2013.01)

(58) Field of Classification Search
CPC ............. G03H 1/0443; G03H 2227/02; G03H 2001/005; G03H 2001/0445; G03H 2222/12; G03H 2222/13; G01B 11/2441; G01B 9/02057; G01B 9/0209
USPC .................. 356/521, 511, 512, 515, 520, 450
See application file for complete search history.

(56) References Cited

U.S. PATENT DOCUMENTS

| | | | | |
|---|---|---|---|---|
| 6,549,285 | B1* | 4/2003 | Wright | G01N 21/1717 356/497 |
| 6,879,427 | B2* | 4/2005 | Mendlovic | G02B 26/06 356/520 |
| 7,023,563 | B2* | 4/2006 | Li | A61B 5/0059 356/521 |
| 7,349,102 | B2* | 3/2008 | Shirley | G01D 5/38 356/512 |
| 7,791,023 | B2* | 9/2010 | Kasai | G03H 5/00 250/311 |
| 7,816,648 | B2* | 10/2010 | Harada | H01J 37/26 250/306 |
| 7,872,755 | B2* | 1/2011 | Harada | H01J 37/295 356/450 |
| 8,785,851 | B2* | 7/2014 | Tanigaki | H01J 37/295 250/306 |
| 9,316,536 | B2* | 4/2016 | Takesue | G01J 1/44 |
| 9,678,476 | B2* | 6/2017 | Smithwick | G03H 1/2294 |
| 2003/0160969 | A1* | 8/2003 | Endo | G01B 11/2441 356/520 |
| 2004/0156098 | A1* | 8/2004 | Dubois | G01N 21/6458 359/368 |
| 2008/0137933 | A1* | 6/2008 | Kim | G01B 9/021 382/131 |
| 2009/0046298 | A1* | 2/2009 | Betzig | G01N 21/6445 356/521 |
| 2009/0296558 | A1* | 12/2009 | Akahoshi | G11B 7/0065 369/103 |
| 2010/0110260 | A1* | 5/2010 | Shin | G03H 1/0866 348/311 |
| 2010/0253986 | A1* | 10/2010 | Awatsuji | G03H 1/0443 359/10 |
| 2010/0271676 | A1* | 10/2010 | Renaud-Goud | G03H 1/22 359/9 |
| 2010/0309465 | A1* | 12/2010 | Liu | G01J 3/44 356/301 |
| 2012/0200901 | A1* | 8/2012 | Dubois | G02B 21/00 359/15 |
| 2013/0088568 | A1* | 4/2013 | Nolte | A61B 5/0075 348/40 |
| 2013/0293697 | A1* | 11/2013 | Sun | G02B 21/361 348/79 |
| 2014/0375792 | A1* | 12/2014 | Yaqoob | G02B 21/14 348/79 |
| 2015/0205260 | A1* | 7/2015 | Awatsuji | G03H 1/0866 348/40 |
| 2017/0003650 | A1* | 1/2017 | Moser | G03H 1/0443 |
| 2017/0131682 | A1* | 5/2017 | Nolte | G03H 1/0443 |

OTHER PUBLICATIONS https://en.wikipedia.org/wiki/Angular_resolution.*
https://en.wikipedia.org/wiki/Fraunhofer_diffraction.*
Knox, C., "Holographic microscopy as a technique for recording dynamic microscopic subjects," Science 153(3739), 989-990 (1966).
Chengala, A. et al., "Microalga propels along vorticity direction in a shear flow," Phys. Rev. E, 87, 052704 (2013).
Sheng, J. et al., "Digital holographic microscopy reveals prey-induced changes in swimming behavior of predatory dinoflagellates," PNAS 104(44), 17512-17517 (2007).
Sheng, J., "A dinoflagellate exploits toxins to immobilize prey prior to ingestion," PNAS 107(5), 2082-2087 (2010).
Vater, S. M. et al., "Holographic microscopy provides new insights into the settlement of zoospores of the green alga *Ulva linza* on cationic oligopeptide surfaces," Biofouling 31(2), 229-239 (2015).
Pavillon, N. et al. "Early cell death detection with digital holographic microscopy," PLoS ONE 7, e0030912 (2012).
Marquet, P. et al., "Digital holographic microscopy: a noninvasive contrast imaging technique allowing quantitative visualization of living cells with subwavelength axial accuracy," Optics letters 30(5), 468-470 (2005).
Kemper, B. et al., "Investigation of living pancreas tumor cells by digital holographic microscopy," Journal of biomedical optics 11, 034005 (2006).
Jourdain, P. et al., "Determination of transmembrane water fluxes in neurons elicited by glutamate ionotropic receptors and by the cotransporters KCC2 and NKCC1: a digital holographic microscopy study," The Journal of Neuroscience 31(33), 11846-11854 (2011).
Janeckova, H. et al., "Proving tumour cells by acute nutritional/energy deprivation as a survival threat: a task for microscopy," Anticancer research 29(6), 2339-2345 (2009).
Miniotis, M. et al., "Digital holographic microscopy for non-invasive monitoring of cell cycle arrest in L929 cells," PLoS one 9, e106546 (2014).
Su, T.-W. et al., "High-throughput lensfree 3D tracking of human sperms reveals rare statistics of helical trajectories," PNAS 109(40), 16018-16022 (2012).
Fenchel, T. "Microbial behavior in a heterogeneous world," Science 296(5570), 1068-1071 (2002).
Fenchel, T. "Eppur si muove: many water column bacteria are motile," Aquatic Microbial Ecology 24(2), 197-201 (2001).
Mitchell, J. G. et al., "Bacterial motility: links to the environment and a driving force for microbial physics," FEMS microbiology ecology 55(1), 3-16 (2006).
Purcell, E. M., "Life at low Reynolds number," Am. J. Phys. 45(1), 3-11 (1977).
Rivera, M. J. et al., "Unraveling the three-dimensional morphology of archean microbialites," Journal of Paleontology 88(4), 719-726 (2014).
Schnars, U. et al., "Direct Recording of Holograms by a CCD Target and Numerical Reconstruction," Applied optics 33(2), 179-181 (1994).
Schnars, U. et al., "Digital recording and numerical reconstruction of holograms," Measurement science and technology 13(9), R85-R101 (2002).
Cuche, E. et al., "Simultaneous amplitude-contrast and quantitative phase-contrast microscopy by numerical reconstruction of Fresnel off-axis holograms," Applied optics 38(34), 6994-7001 (1999).
Cuche, E. et al., "Spatial filtering for zero-order and twin-image elimination in digital off-axis holography," Applied optics 39(23), 4070-4075 (2000).
Mann, C. et al., "High-resolution quantitative phase-contrast microscopy by digital holography," Optics Express 13(22), 8693-8698 (2005).
Zhang, F. et al., "Reconstruction algorithm for high-numerical-aperture holograms with diffraction-limited resolution," Optics letters 31(11), 1633-1635 (2006).
Colomb, T. et al., "Automatic procedure for aberration compensation in digital holographic microscopy and applications to specimen shape compensation," Applied optics 45(5), 851-863 (2006).
Xu, W. et al., "Digital in-line holography for biological applications," PNAS 98(20), 11301-11305 (2001).
Molaei, M. et al., "Imaging bacterial 3D motion using digital in-line holographic microscopy and correlation-based de-noising algorithm," Optics Express 22(26), 32119-32137 (2014).
Yamaguchi, I. et al., "Phase-shifting digital holography," Optics letters 22(16), 1268-1270 (1997).

(56) References Cited

OTHER PUBLICATIONS

Jericho, S.K. et al., "In-line digital holographic microscopy for terrestrial and exobiological research," Planetary and Space Science 58, 701-705 (2010).
Kuhn, J. et al., "A Mach-Zehnder digital holographic microscope with sub-micrometer resolution for imaging and tracking of marine micro-organisms," Review of Scientific Instruments 85(12) (2014).
Junge, K. et al., "Motility of colwellia psychrerythraea strain 34H at subzero temperatures," Appl Environ Microbiol 69(7), 4282-4284 (2003).
Gong, Y. et al., "Image enhancement by gradient distribution specification," Proc. ACCV, 12th Asian Conference on Computer Vision Workshop on Emerging Topics in Image Enhancement and Restoration, w7-p3 (2014).

* cited by examiner

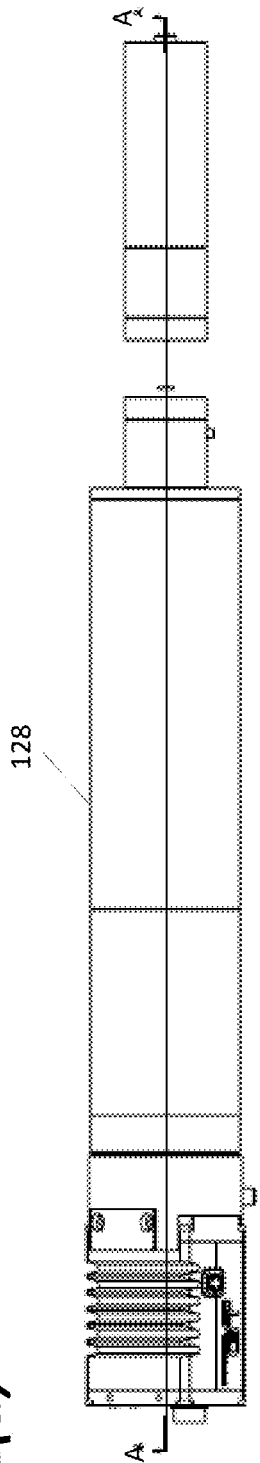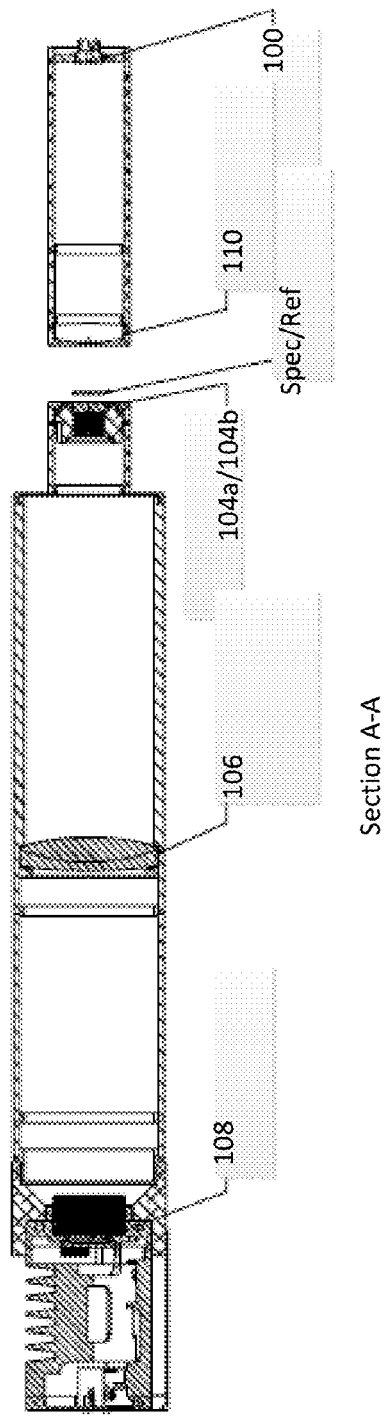

Fig. 2(a)
Fig. 2(b)
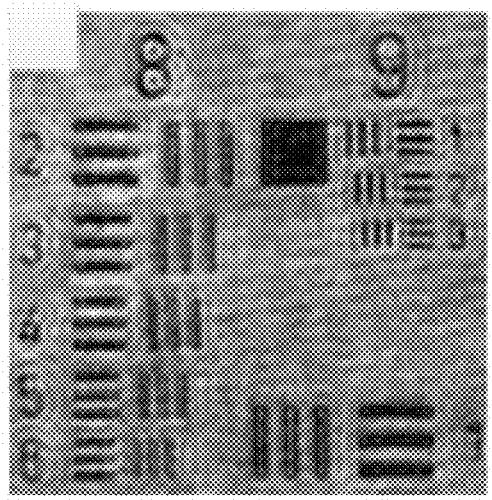
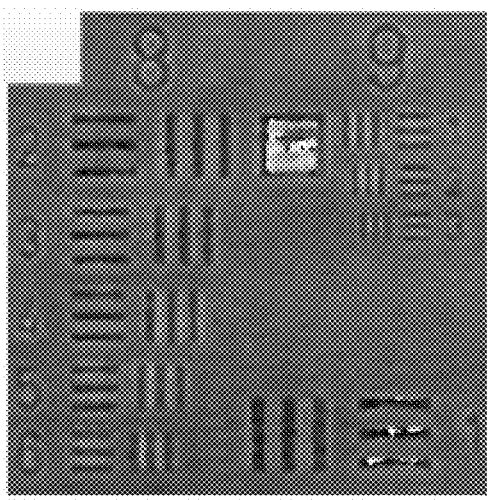
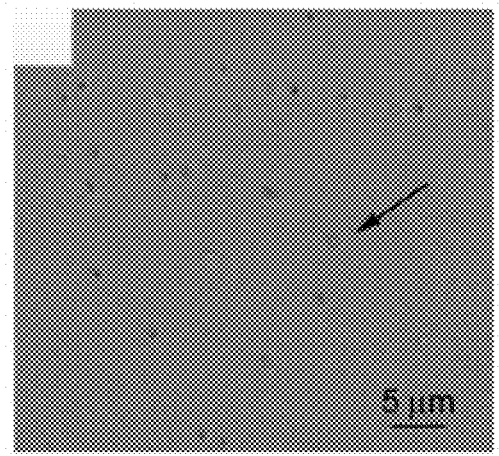
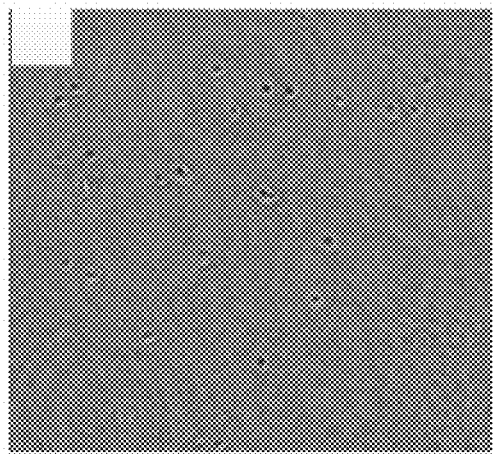
Fig. 2(c)
Fig. 2(d)

*Fig. 3(a)* *Fig. 3(b)* *Fig. 3(c)*
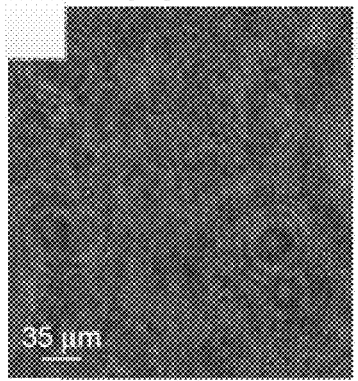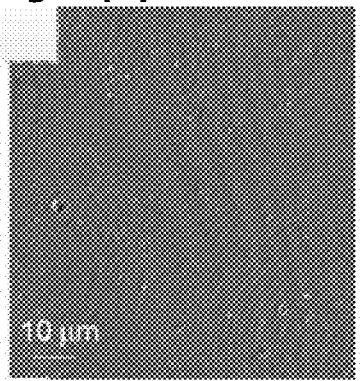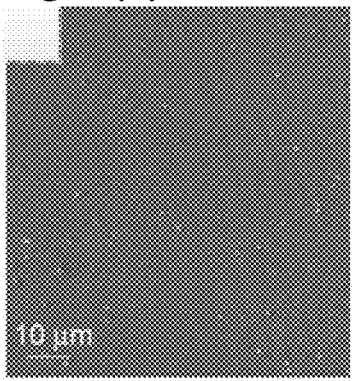
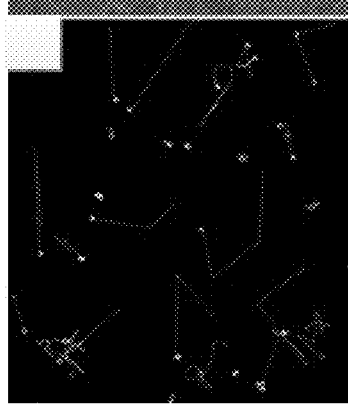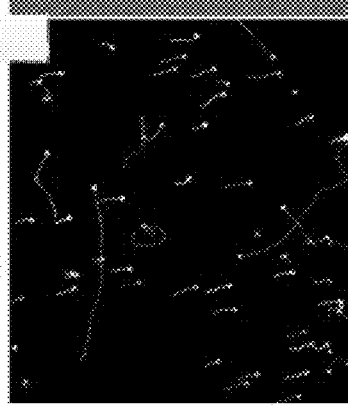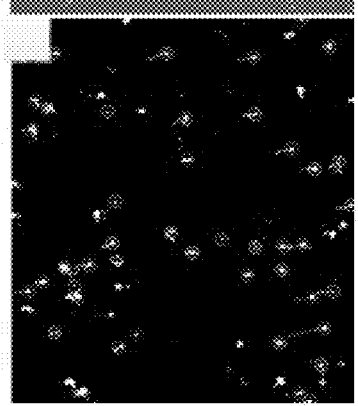
*Fig. 3(d)* *Fig. 3(e)* *Fig. 3(f)*

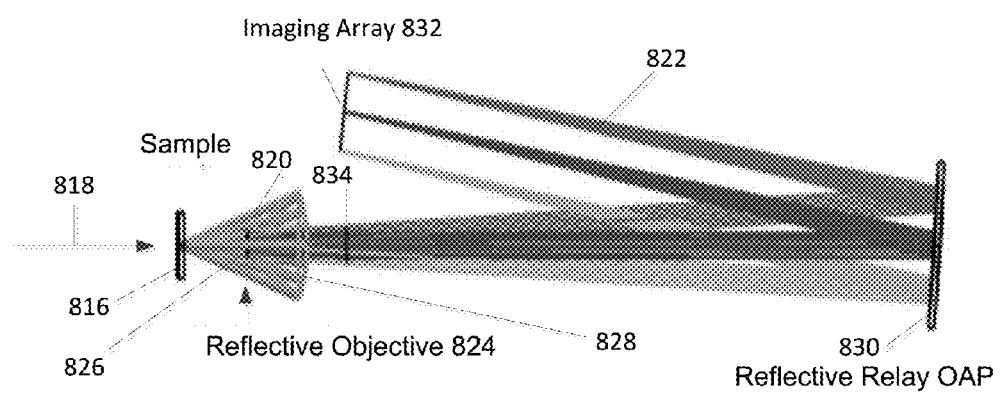
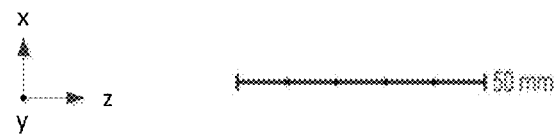
Fig. 8b

COMMON-MODE DIGITAL HOLOGRAPHIC MICROSCOPE

CROSS REFERENCE TO RELATED APPLICATIONS

This application claims the benefit under 35 U.S.C. Section 119(e) of the following commonly-assigned U.S. Provisional Patent Applications:

U.S. Provisional Patent Application Ser. No. 62/078,288, filed on Nov. 11, 2014, by Kurt M. Liewer, Christian A. Lindensmith, Eugene Serabyn, Stephanie Rider, Emilio C. Graff, and James K. Wallace, entitled "A COMMON-MODE DIGITAL HOLOGRAPHIC MICROSCOPE,"; and U.S. Provisional Patent Application Ser. No. 62/079,342, filed on Nov. 13, 2014, by Kurt M. Liewer, Christian A. Lindensmith, Eugene Serabyn, Stephanie Rider, Emilio C. Graff, and James K. Wallace, entitled "A COMMON-MODE DIGITAL HOLOGRAPHIC MICROSCOPE,";

which applications are incorporated by reference herein.

STATEMENT REGARDING FEDERALLY SPONSORED RESEARCH AND DEVELOPMENT

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

This invention relates to a digital microscope.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Bacterial motility plays a role in critical environmental and physiological processes, including nutrient cycling, biofouling, and virulence. Despite its importance, motility has only been studied in a few test organisms because of the difficulties of imaging moving micrometer-sized cells. However, the study of the motility of microorganisms is a field which promises to be revolutionized by digital holographic microscopy (DHM) [1]. Because this imaging technique instantaneously probes a large sample volume (milliliters) in three dimensions, it enables the reconstruction of swimming trajectories of essentially unconstrained cells. The feasibility of this approach has been demonstrated in the open ocean for measurements of the distribution and swimming patterns of plankton [2], and investigation of dinoflagellate feeding behavior [3,4]. It has also been used in the laboratory to study motility of algal zoospores [5] and cultured cells [6-12]. However, because of the technical limitations of existing fieldable DHM instruments, such field experiments have so far been restricted to eukaryotic cells>10 μm in diameter. In order to capture bacterial motility, real-time imaging with spatial resolution of <1 μm in all dimensions is required. Such an instrument would allow for in situ investigations of bacterial motility in bodies of water, which has relevance to basic physics and microbiology [13-16] as well as to applications such as water-quality monitoring and astrobiology [17].

Imaging moving bacteria is challenging because of the small size of the cells, their rapid motion (tens to hundreds of cell lengths per second), and their low contrast. Light microscopy relies upon a wide selection of dyes for increasing contrast of specific cell types and subcellular structures. An "off-axis" DHM provides both amplitude and phase images, where contrast in the amplitude image is provided by sample absorptivity at the probe wavelength, and contrast in the phase image results from a difference in index of refraction between the sample and its surrounding medium. Depending upon the organism, one or the other of these image types (or their derived constructs such as phase contrast or DIC) may provide sufficient contrast for identifying and tracking single cells, making dyes unnecessary. This is a distinct advantage over single-beam or "in-line" instruments, where the amplitude and phase images cannot be readily deconvolved without modifications that preclude real-time observation.

In digital holography, recording of the optical interference—fringes—is not done with photographic plates, but with an array detector [18-20]. To record fringes of high contrast over the detector integration time requires: 1) the optical path length difference between the reference arm and science arm be well within the coherence length of the source, 2) that the fringes not shift significantly during the exposure time (which is equivalent to saying the path length variations must be stable to much less than a wavelength at this timescale). For off-axis holography the fringe carrier frequency must also be well sampled by the CCD, in order to accommodate the sample bandwidth [21].

Like classic holography, digital holography enables the reconstruction of an electric field at a given plane a-posteriori—but it relies upon a computer to perform a numerical reconstruction [22-24]. However, it adds two unique capabilities: the ability to numerically reconstruct this electric field at any other plane along the optical axis, and do so as a function of time. In this way, data acquisition consists of a time series of recorded holograms, and afterwards the electric field in a volume is numerically reconstructed for each time stamp, creating a time-lapse movie of a three-dimensional volume.

Several optical configurations have been proposed for the recording step in digital holography: 1) lens-less "Gabor-type" configuration with a simple pinhole divergent illumination [25] or 2) inline holography schemes usually enable compact and straightforward implementation. Although a dual-beam in-line geometry is compatible with phase-shifting [26] (at the price of real-time capability), the previously-mentioned schemes generally cannot discard or deconvolve the contribution from the "twin image" (complex conjugate) of the reconstructed field, hence superposing the final image with an out-of-focus "ghost". Alternatively, off-axis implementations, using a tilted reference wave to encode the sample wavefront with a fringe pattern, have been employed [18,20]: these provide a spatial multiplexing in the Fourier domain, thus enabling spatial filtering [21] and retrieval of the object complex wavefront free of artifacts. However, off-axis layouts frequently result in rather large instruments, which are alignment-sensitive (notably for accurately dialing the fringe carrier frequency). They are generally less-suited for extreme environments in terms of mechanical and thermal stress with their two-beam geometry (usually Mach-Zehnder or Michelson-type). One or more embodiments of the present invention described a new design that maintains the off-axis implementation, but with a robust optical design which maintains performance.

SUMMARY OF THE INVENTION

One or more embodiments of the invention disclose an imaging system (e.g., an off-axis digital holographic microscope), comprising at least one coherent electromagnetic radiation source emitting electromagnetic radiation; a collimator positioned to collimate the electromagnetic radiation and form collimated electromagnetic radiation; a sample mount; and a microscope assembly.

The sample mount is positioned such that a sample mounted on the sample mount interacts with the collimated electromagnetic radiation to form sample electromagnetic radiation, and one or more references mounted on the sample mount interact with the collimated electromagnetic radiation to form reference electromagnetic radiation.

The microscope lens assembly, comprising a first lens, a second lens, and a relay lens, can be positioned such that:
  at least a portion of the sample electromagnetic radiation is transmitted through the first lens, and then the relay lens, to a detector,
  at least a portion of the reference electromagnetic radiation is transmitted through the second lens, and then the relay lens, to the detector,
  the portion of the sample electromagnetic radiation and the portion of the reference electromagnetic radiation are directed by the relay lens onto the detector at an angle with respect to each other so as to form an interference pattern on the detector, and
  one or more computers can numerically/digitally construct/compute an image of the sample from the interference pattern detected by the detector. The one or more computers can compute an amplitude and/or phase of one or more electric fields at the sample.

The microscope assembly can comprise a reflective objective and a relay mirror, positioned such that:
  at least a portion of the sample electromagnetic radiation and the reflected electromagnetic radiation are reflected from the reflective objective, and then the relay mirror, to an imaging array,
  the portion of the sample electromagnetic radiation and the portion of the reference electromagnetic radiation are directed by the relay mirror onto the imaging array so as to form an interference pattern on the imaging array, and
  one or more computers can numerically/digitally construct/compute an image of the sample from the interference pattern detected by the imaging array.

The electromagnetic radiation can comprise a single or multiple (fixed or scanned) wavelengths. The sample mount can comprise a sample window transmitting the multiple wavelengths to the sample, and a plurality of reference windows, each of the reference windows transmitting a different one of the wavelengths to one of the plurality of the references.

The imaging system can have a transmission geometry such that the first lens and the second lens collect at least some of the sample electromagnetic radiation transmitted through the sample.

The imaging system can have a reflection geometry such that the first lens and the second lens collect at least some of the sample electromagnetic radiation reflected by the sample.

The sample can comprise one or more biological cells in a liquid and the reference can comprise the liquid.

The image can have a resolution of less than 1 micrometer over a 0.4 mm×0.4 mm×0.4 mm volume of the sample.

Positions of the collimator, the sample mount, the sample, the references, the first lens, the second lens, and the relay lens can be such that a resolution of the image does not change when a temperature, of an environment in physical contact the imaging system, is reduced from 20° C. to −26° C., without adjustment of the positions.

The imaging system can be portable to, and operational in, a marine environment or an arctic environment in physical contact with the imaging system, without adjustment of positions of the collimator, the mount, the first lens, the second lens, and the relay lens.

The sample mount, the first lens, and the second lens can be positioned such that the portion of the sample electromagnetic radiation comprises a first straight line trajectory from the sample to the relay lens and passing through a center of the first lens, the portion of the reference electromagnetic radiation comprises a second straight line trajectory from the sample to the relay lens and passing through a center of the second lens, and the first straight line trajectory and the second straight line trajectory are parallel.

A sample window can be placed in front of the sample to define the area of the sample irradiated by the collimated electromagnetic radiation. A reference window can be placed in front of each of the references to define the area of each of the references irradiated by the collimated electromagnetic radiation.

The first lens can be positioned at a distance $f_o$ from the sample, wherein $f_o$ is a focal distance of the first lens. The second lens (identical to the first lens) can be positioned at the distance $f_o$ from the reference.

The components of the imaging system can be fixed such that:
  an optical path length, from a center of the sample window to a center of the detector, can be identical to each optical path length from each center of each reference window to the center of the detector, and
  an optical path length from an output of the source to the center of the sample window can be identical to each optical path length from the output to each center of each reference window.

The first lens and second lens can be co-mounted on a lens mount such that both the first lens and the second lens move together as a unit under thermal bending. The components of the imaging system can be positioned such that lateral thermal motion of the sample and/or relay lens relative to the remainder of the imaging system only laterally shifts the fringe pattern on the detector and does not affect the image.

The imaging system allows fabrication of a microscope without a beamsplitter or mirror, wherein the sample and the reference are irradiated by a single, common, and unsplit region of the collimated beam.

One or more embodiments of the invention further disclose a lens-less imaging system. The lens-less system comprises a first single mode waveguide guiding first coherent electromagnetic radiation onto a sample, wherein the sample transmits the first coherent electromagnetic radiation to form sample electromagnetic radiation. The lens-less system further comprises a second single mode waveguide fixed at an angle with respect to the first single mode waveguide, the second single mode waveguide guiding second coherent electromagnetic radiation onto a reference, and the reference transmitting the second coherent electromagnetic radiation to form reference electromagnetic radiation. The lens-less system further comprises a camera positioned to detect an interference pattern formed by the reference electromagnetic radiation and the sample electromagnetic radiation interfering on the camera.

BRIEF DESCRIPTION OF THE DRAWINGS

Referring now to the drawings in which like reference numbers represent corresponding parts throughout:

FIGS. 1(a)-(e) are schematics and images of the compact, twin-beam digital holographic microscope in its laboratory implementation, according to one or more embodiments of the invention. FIG. 1(a) is a schematic showing the four main elements (discussed in the text): the source, the sample (specimen path is labeled Spec. and reference path is labeled Ref.), the microscope, and the sensor. FIG. 1(b) is a solid model of the hardware, wherein the fiber-fed source assembly is at the bottom, the imaging camera is at the top, the microscope optics (comprised of the two aspheric lenses and the relay lens) are contained within the 300 mm long lens tube, and the three-axis stage between the source the microscope optics provides easy manual manipulation of the specimen under study. FIG. 1(c) is a photograph of the instrument in the laboratory, wherein a shutter over the collimating lens protects against condensation, and is operated remotely by a controller. FIG. 1(d) and FIG. 1(e) are computer aided design (CAD) drawings of the holographic microscope.

FIGS. 2(a), (b), (c) and (d) illustrate images showing resolution performance of the compact, twin-beam system of FIG. 1(a)-(d). Standard USAF resolution target reconstructions in amplitude and phase are shown in FIG. 2(a) and FIG. 2(b), respectively (these images show group 9, and all three elements resolved, where element 3 has a line width of 0.78 µm). FIG. 2(c) shows phase reconstruction of an image of live, motile bacterial cells (a phase shift from dark to light occurs as the organisms swim out of the focal plane (arrow)). FIG. 2(d) shows intensity reconstruction of the same bacterial cell image.

FIGS. 3(a)-(f) show images of the motility of a psychrophilic bacterial species, *Colwellia psychrerythraea*, captured at a range of temperatures with the compact, twin-beam system of FIG. 1(a)-(d), wherein FIG. 3(a) is a hologram, FIG. 3(b) is a reconstructed phase image at +6° C. (Media 1), FIG. 3(c) is a reconstructed intensity image at −15° C. (Media 2), FIG. 3(d) shows tracks of individual cells at +6° C., FIG. 3(e) shows tracks at −13° C., and FIG. 3(f) shows tracks at −15° C. (the slight motion of cells to the right is drift and does not represent bacterial motility and the diffraction rings seen in the images are out-of-focus cells on a different plane).

FIG. 8b illustrates a digital holographic microscope using a reflective geometry according to one or more embodiments of the invention, wherein the scale is 50 millimeters (mm).

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

One or more embodiments of the invention disclose an off-axis DHM instrument which implements the off-axis geometry as a compact, twin-beam layout which renders the instrument largely insensitive to errors in alignment, making it ideal for rough transport and handling conditions. It demonstrates sub-micron lateral resolution inside a 3D volume of $360 \times 360 \times 600$ µm$^3$ permitting imaging and tracking of multiple single bacterial cells. Furthermore, the proposed system according to one or more embodiments is implemented in a self-aligned robust lightweight package requiring no fine alignment, which makes it ideal for field use. In the following sections, the instrument, its capabilities, and its advantages are described. In particular, the performance of the instrument is highlighted using an extremophile bacterial test species, including measurements made at sub-freezing temperatures.

Figures 1A, 1B, 1C:
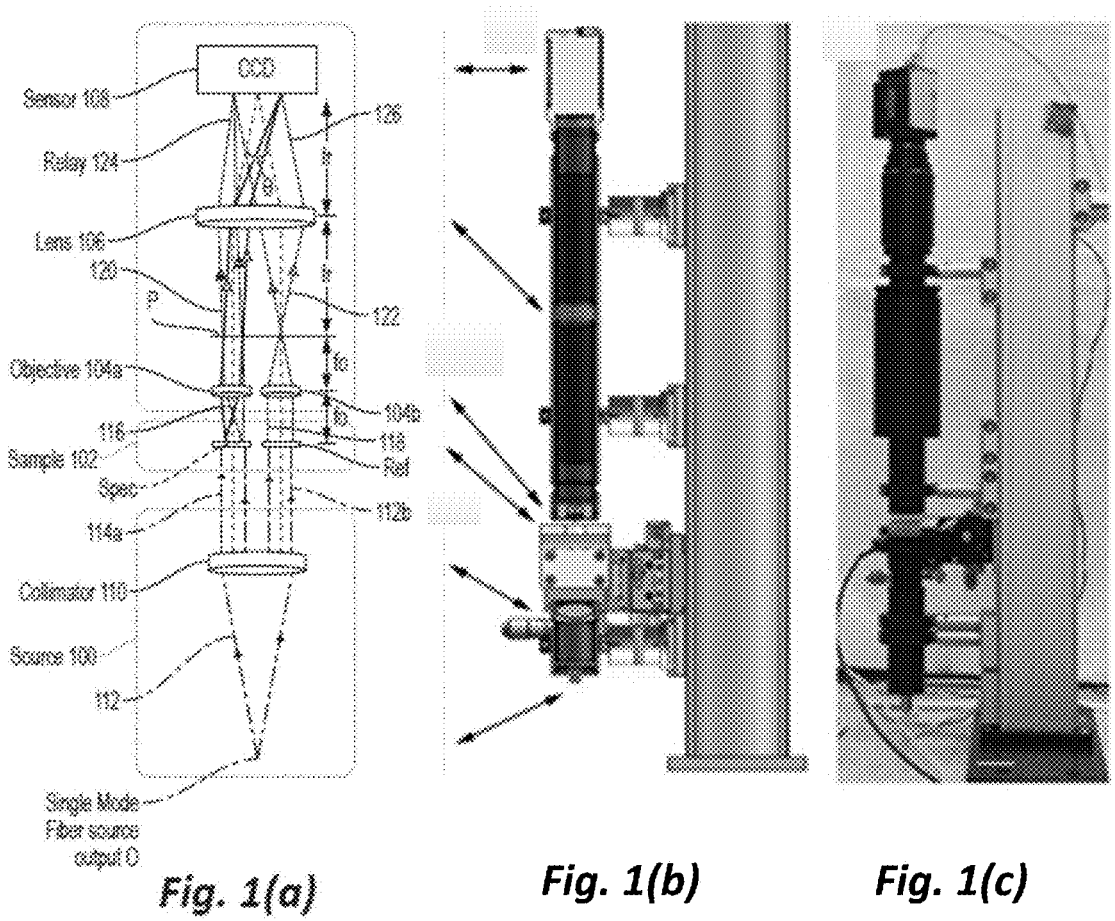

A. Design Description of the Compact, Twin-Beam Off-Axis Digital Holographic Microscope System According to One or More Embodiments of the Invention A diagram of the optical system is shown in FIG. 1(a). This diagram captures the key components but is not to scale, so lengths and angles are not representative of the as-built system, as shown in the CAD drawing in FIG. 1(b). A photograph of the actual instrument is given in FIG. 1(c), and specifications in Table 1. There are four main components to the system: the source 100 (comprising a single mode fiber source), the sample 102 (comprising specimen (spec.) and reference (ref.), the microscope optics (comprising objectives 104a, 104b and relay lens 106, and the sensor 108 (e.g., CCD)). Also illustrated are the collimator 110, rays 112 emitted by the single mode fiber source, collimated rays 114a-b, rays 116 transmitted by the sample (spec.), rays 118 transmitted by the reference (ref.), rays 120 collected and transmitted by objective 104a, rays 122 collected and transmitted by the objective 104b, rays 124 from the sample that are collected and transmitted by the relay lens 106 to the CCD, and rays 126 from the reference that are collected and transmitted by the relay lens to the CCD. The objective 104a and objective 104b are identical and positioned at a distance $f_o$ from the sample and reference, respectively ($f_o$ is the focal length of the objectives 104a-b). Pupils/apertures P are positioned at a distance $f_o$ after the objectives 104a-104b.

The relay lens 106 is positioned at a distance $f_r$ from the pupil P and the CCD, where $f_r$ is the focal length of the relay lens 106.

FIG. 1(d) shows the enclosure/case 128 for the optics and section A-A, and FIG. 1(e) shows the positioning of the imaging sensor 108, relay lens 106, objectives 104a and 104b for the sample and reference, the sample (spec and ref), collimator 110 (comprising collimating lens), and single mode fiber source 100.

TABLE 1

Fundamental Properties of the compact, twin-beam DHM system

| Property | Value | Unit | Note |
|---|---|---|---|
| Operating Wavelength | 405 | nm | Single-mode fiber-coupled laser |
| Objective focal length- $f_o$ | 7.6 | mm | Aspheric singlet |
| Objective Numerical Aperture | 0.30 | | |
| Relay lens focal length- $f_r$ | 150 | mm | Achromatic Doublet |
| System magnification | 19.7 | | |
| Lateral resolution | 0.7 | μm | |
| CCD pixel size | 3.45 × 3.45 | μm × μm | 2448 × 2050 CCD chip |
| Sample imaging volume | 360 × 360 × >600$^a$ | μm × μm × μm | In 2048 × 2048 (4 Mpx) mode |
| Sampling Rate | 15 | frames per sec | 4 Mpx mode; 22 fps with 1 Mpx |
| Instrument length | 400 | mm | Input fiber to back of CCD |

$^a$A measurement of the instrument lateral resolution for different depths demonstrated it is capable of <1 μm lateral resolution over a sample depth of 900 μm. Our sample chamber is 600 μm deep.

1. Source

The source 100 is a single mode fiber-coupled laser diode, operating at a wavelength of 405 nanometers (nm) to optimize lateral resolution while avoiding phototoxic ultraviolet, and a one-inch diameter f=100 mm collimating lens. Optical power is tunable between 1 and 10 milliwatts (mW) depending on the choice of camera shutter time. The beam illuminates two sample volumes that are spatially located ±3 mm away from the optical axis. The use of the single mode input as a source ensures a high degree of spatial coherence. This embodiment chose a lens matched to the numerical aperture of the optical fiber, such that the sub-apertures are homogeneously illuminated and the aberration from the collimator is kept small over each sub-pupil.

2. Microscope Optics

The microscope assembly is composed of a pair of aspheric singlets as objectives, followed by a common relay lens. Aspheric lenses are chosen because they are of sufficient quality to yield diffraction-limited imaging capabilities while avoiding the cost and complexity of compound objectives. In an interferometric system, it is important to minimize internal reflections. These are unavoidable in compound objectives, which usually contain a handful of lenses to correct for several colors of spherical and chromatic aberration. Because monochromatic light is used in this embodiment, correction for chromatic aberration or spherical correction for more than one wavelength is not required. The aspheric lenses have moderately high numerical aperture (NA~0.3), a clear aperture of 4.7 mm, and are separated from each other by 6 mm. The focal length of these objectives, represented by $f_o$, is 7.6 mm. At the front focal plane is the sample being imaged, and at the back focal plane is a circular pupil stop which is sized such that the image performance remains diffraction limited, while preventing scattering contributions in the downstream tube from marginal rays. In the reference arm, the illumination simply passes through a channel that is either clear glass, or glass plus sample-free liquid.

The relay lens of the microscope has two functions. First, because both reference and object beams are located off the axis of symmetry of the relay lens, upon passing through this lens, the beams will be directed towards each other and meet a focal length away where the detector is located. The separation of the beams, s, and the focal length of the lens $f_r$ give the angle $\theta_{fr}$ at which the beams are recombined:

$$\theta_{fr} = s/f_r \quad (1)$$

The second action of the lens is to form a real image of the sample onto the imaging array. This image will be magnified by the ratio of the focal lengths, $m=f_r/f_o$. In the actual instrument, the relay lens has a focal length of ~150 mm, and the magnification is therefore ×19.7. The actual image planes within the sample volume are then reconstructed numerically, with the nominal working distance (WD) of the objectives of 1.2 mm corresponding to a median reconstruction distance of zero (in-focus on the CCD array).

3. Imaging Sensor

The final component in the system is the imaging sensor (two cameras were used interchangeably, the Baumer TXG-50 and the AVT Prosilica GT2450B), for which the goals are a large field of view with small pixels and rapid readout. The two cameras use an identical sensor array, however the Prosilica is rated for lower operating temperature, hence more suited for field operation. The main requirement for the camera is that the fringes be oversampled to simultaneously accommodate the bandwidth of the magnified sample, while separating the interference terms in the Fourier domain with no overlap to enable spatial filtering [9]. These adjacent pixels are to be along the detector diagonal to optimize the sampling. A first approximation of this angle at which the beams recombine at the focal plane corresponds to the mid-point along the diagonal bandwidth of the detector, which is given by:

$$s_{fr} > 2\sqrt{2}p \quad (2)$$

where $s_{fr}$ is the fringe spacing and p is the pixel edge size, or $$\theta_{fr} < \frac{\lambda}{2\sqrt{2}\,p} \quad (3)$$

A wavelength of 405 nm and a pixel size of 3.45×3.45 μm² results in a recombination angle at the detector of 0.0415 radians (2.378 degrees). From Eq. 1, the instrumental fringe spacing provided by the baseline between the two objective lenses is 6 mm/150 mm, or 0.04 rad (2.29 degrees), which thus meets this requirement.

In this compact, twin-beam design, the ratio of the spatial resolution to the fringe spacing is given by $s/d_o$, where $d_o$ is the objective diameter and s is the lateral separation between the objective lens pair. This ratio is in general ≥1, being unity in the limiting case of two identical side-by-side lenses in contact. Thus choosing a pixel size to properly sample the fringes will inherently lead to an adequate sampling of the point spread function (PSF). The lateral resolution at the object plane is given by $\lambda/2NA$, which for our system is 0.405 μm/0.6=0.7 μm. This PSF is magnified by a factor of about 20 in this system, so at the detector the spot size is 14 μm, which is indeed well oversampled by 3.5-micron pixels.

4. Opto-Mechanics

The optics are mounted in commercially available lens tube assemblies. Use of these components yields a readily affordable system that is mechanically stiff, thus ensuring long-term stability. The lens tubes entirely enclose the optics, thus mitigating against both particulate contamination and turbulence due to stray air currents. The lens tubes are internally threaded and black anodized which acts to baffle stray light. The element which holds the aspheric lenses is a three dimensional (3D) printed part. It precisely sets the lens separation, and references them to the pupil stop at their back focal length.

Figures 1F, 1G:
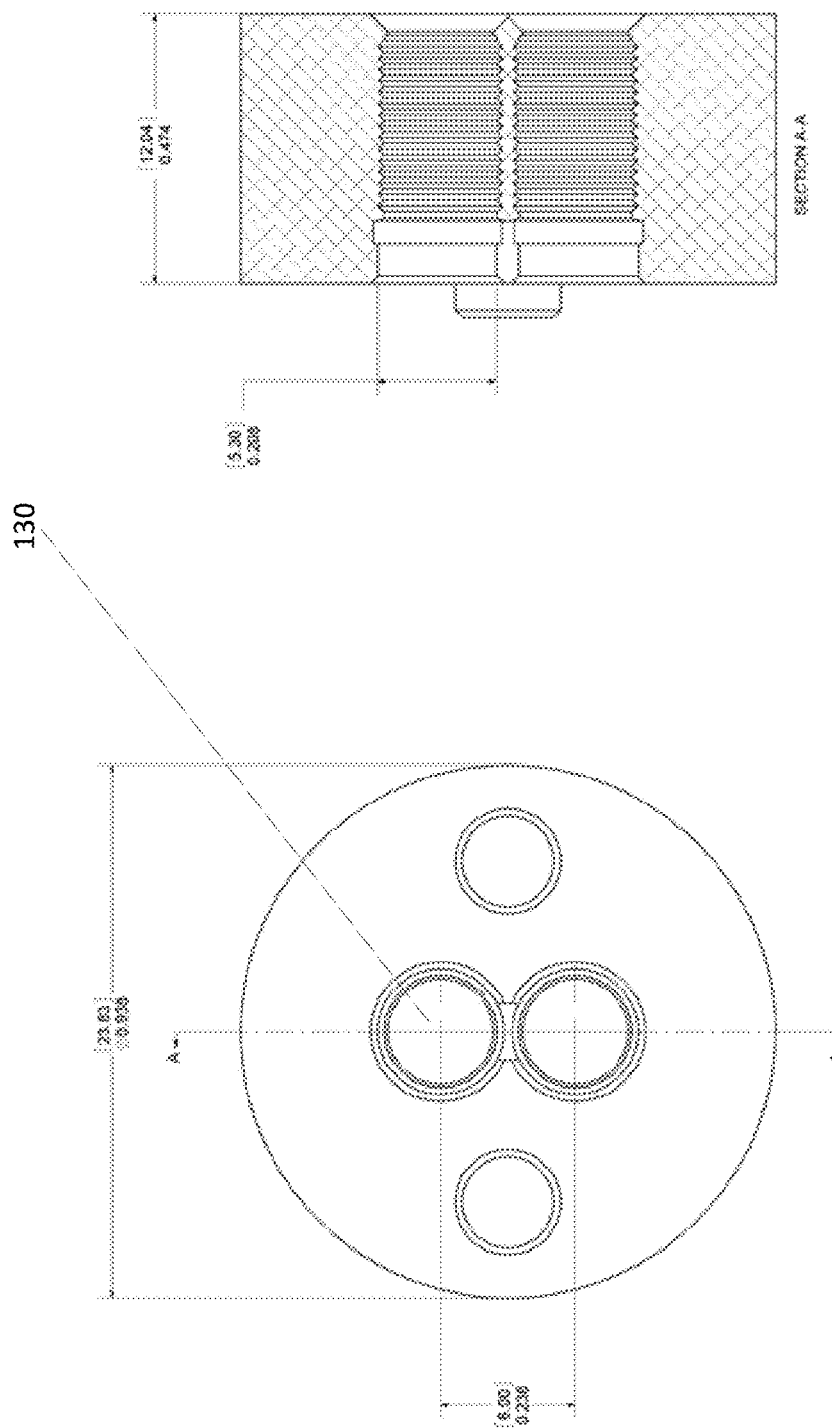
FIG. 1(f) is a face view.
FIG. 1(g) is a cross-sectional schematic, of a 3D printed asphere holder used to mount the objectives in the holographic microscope, wherein dimensions are in millimeters (mm), according to one or more embodiments of the invention.

The current implementation of the common mode instrument uses threaded retaining rings to fix optics in place. In the field version, the threaded retaining rings were staked with adhesive to prevent vibration loosing, and the asphere lenses were set in the 3D printed holder with silicone adhesive to prevent moisture ingress. FIGS. 1(f) and 1(g) provide some details regarding the 3D printed asphere holder, and illustrates the hole for mounting the objective lens 104a-b. Future versions of the instrument according to one or more embodiments can use more sophisticated custom optics mounts geared towards flight ready parts.

In this laboratory implementation, the lens tube mechanics are mounted vertically on a rail. This has the advantage of being compatible with liquid sample chambers, with little to no effect of gravity on the specimens. A three-axis manual stage is added to this rail to permit manipulation of the sample chamber located between the source collimator and the objective pairs. An electrically controlled shutter between the collimation lens assembly and twin objectives shields the source lens, which is "up-looking," from contamination and condensation when exposed to sudden temperature gradients.

5. Sample Chamber

The fundamental requirement of this design is that the two arms—science and reference—be matched in optical path to the detector to within the coherence length of the laser. For samples of low density, and where absolute motility is not required (such as those often collected in environmental microbiology) there is no optical need to distinguish between science and reference beams, and there is no need to partition. The samples fluid may serve as both reference and object. However, one or more of the inventors note that this choice is acceptable for motility studies where the absolute position is not required. In studies of taxis where it is fundamental to know if a specimen is swimming towards or away from a given stimulus, it's necessary to distinguish science and reference sample chambers. Thus, an ordinary microscope slide and coverslip make an appropriate sample for this instrument, and the bacterial data presented in this paper were taken using this arrangement. An adhesive silicone gasket may be used to create a deeper chamber by cutting a rectangular or square well >6 mm on a side and sandwiching it between the slide and coverslip.

For dense samples, it is desirable to have a reference chamber filled with a blank solution, with the sample contained only within the object chamber. Commercial chamber slides are available with the correct spacing; for example, Electron Microscopy Sciences part 70326-30.

In all cases, it is important that the beams pass through optical-quality glass or a very thin polymer layer. Quantitative phase information cannot be extracted for samples imaged through polymers such as polydimethylsiloxane (PDMS) because of the complex phase structure of these materials.

6. Comparison of the Compact, Twin-Beam Microscope with Other DHM Designs

The compact, twin-beam system as presented here has several advantages. The instrument is intrinsically coherent, in that the optical path lengths from the center of the science window, and the center of the reference window to the center of the CCD are identical, as are the paths from the laser to the center of the sample and reference windows. Thus, the zero optical path difference position is always at the center of the CCD. This intrinsic instrumental coherence reduces the requirement for coherence and stability of the source, reducing cost and making the instrument easier to set up.

The system is also insensitive to misalignment, at least to first order regarding slight deviations from nominal position due to shocks, thermal bending or assembly repeatability. Axial motion of the camera is not important, because the electric field measured at the CCD can be used to reconstruct the field at different depths [20,22,23]. The position of the relay lens is also not critical, as it determines the final image plane relative to the CCD, which, as mentioned, is not critical. Given that the science objective images the sample to infinity, to first order a change in the objective lens/relay lens separation will not change the final image location on the sensing array. The aspheric lenses are co-mounted in a single holder, so both elements move together as a unit. Any lateral motion relative to the sample or relay lens only laterally shifts the final image position on the CCD, which is unimportant for large detector arrays. Finally, small relative motion of the source assembly with respect to the rest of the microscope is also unimportant in all three degrees of freedom, because the source beam is collimated. This compact, twin-beam system is thus insensitive to essentially all potential slight misalignments of its optics. Finally, because of the ability of the system to reconstruct images to a range of distances, the source axial location need not be set extremely precisely either, allowing for relatively inexpensive sample stages.

Overall, our system has fewer elements and is more compact than traditional off-axis DHM layouts, such as the Mach-Zehnder implementation [20,30], albeit probably not compatible with extremely high NA immersion objectives. Indeed, the roles of the split beamsplitter and the recombination beamsplitter in the Mach-Zehnder are played by the single mode input fiber and CCD focal plane array, respectively. In addition, the "natural" fringe spacing provided by the common relay lens greatly facilitate the initial alignment in the lab, and is a non-issue in the field should the instrument be serviced in rough environmental conditions. To some extent, our proposed twin-beam geometry shares the compactness advantage offered by inline pinhole DHM systems, as previously used for microbial life studies in wet environments [25,28]. However, in addition, it also benefits from increased inherent robustness, and relies on an off-axis geometry to deliver true quantitative wavefront retrieval which is free of artifacts. The only real trade of this geometry is that the overall dimensions of any sample should not exceed a few millimeters, at least in one direction, in the case where one needs to accommodate a free beam path for the reference arm. This is not an issue with a large range of biological applications.

7. Measured Performance of the Compact, Twin-Beam System in the Lab

The performance of the microscope was validated by quantifying its resolving power with a high-resolution US Air Force Target. This measurement was non-trivial, as the highest resolution targets are at the center of the target, yet a clear, reference window 6 mm from the target is required for the reference beam. However, it was indeed possible to image this area with the system, and the imaging performed as expected. FIG. 2(a) shows an amplitude reconstruction and FIG. 2(b) shows a phase reconstruction of a hologram of the resolution target as recorded by the compact, twin-beam system. Group 9 was clearly resolved; within this group, element 3 has a spatial frequency of 645 line pairs/mm (0.78 µm wide lines). In this embodiment KOALA™ software from LynceeTec was used for the holographic reconstructions [29].

Lateral resolution in aqueous solution was examined by imaging a bacterial test species, the marine psychrophile *Colwellia psychrerythraea* strain 34H. FIGS. 2(c) and 2(d) shows amplitude and phase reconstructions of organisms at a density of ~$10^7$ cells/mL on a microscope slide. The phase and intensity images are reconstructions on a single z-plane; they were cropped and median-subtracted to reduce noise, but otherwise unprocessed. The different noise patterns and contrast of the intensity and phase images can be readily appreciated from these images; the system is clearly able to resolve individual cells.

One or more of the inventors note that this instrument is also appropriate for imaging many types of biological samples, as long as the samples are consistent with the lateral image size (360 µm×360 µm) and the lens separation of 6 mm. Cultured mammalian cells and organisms as large as *Caenorhabditis elegans* may be readily visualized.

The fringe stability for the new design is favorable, with optical path length jitter of only a small fraction of a wavelength over several seconds. The fringes are then essentially frozen by the typical exposure time of a few tens of milliseconds or less. This stability allows for adjustment of laser power and integration time depending solely upon the motility of the species under study, and not the instrument stability.

Early versions of the compact, twin-beam system suffered from residual ring-like features which also caused spurious amplitude effects. One or more of the inventors suspected that these effects were due to tooling marks from the aspheric lens molds. Judicious selection of superior quality aspheric lenses removed these unwanted features.

8. Operation of the Compact, Twin-Beam System in Below-Zero Environments

A key goal of this new DHM configuration is to allow microbiologists to take the instrument into the field for in situ studies of bacteria, including extremophiles. This will require operation at extreme ambient temperatures and humidity conditions, as bacterial motility has been observed down to −10° C. In order to test our instrument under these harsh conditions, preliminary experiments were performed using a laboratory freezer to provide the extreme temperatures anticipated/experienced during operation in one or more embodiments. These hardware tests also allowed one or more embodiments of the invention to image bacterial motility of species at different temperatures and salinities, and to confirm previous results on the extreme temperature limit of bacterial motility.

The entire rail-mounted instrument as shown in FIG. 1(c) was placed into a freezer and monitored for any significant degradation in performance during operation over the course of ten days. The freezer set-point was changed from −11 to −26° C. to explore the science and engineering at these temperatures. A single layer of insulation (bubble wrap) was placed around the camera, with a thermocouple to monitor camera temperature. The camera was left on and actively capturing images throughout the duration of the experiments, and its temperature did not fall below 20° C. The instrument operation and performance were unchanged over these temperatures, with only one minor issue: when the freezer door was opened, outside humidity quickly condensed on the collimation lens, causing it to fog over with ice crystals. Once the door was closed, this would dissipate over the span of a few minutes and the instrument would return to routine operation, but after several episodes of icing and de-icing it was necessary to remove and clean the collimating lens. In order to prevent fog formation, an electrically controlled shutter was added just above the collimation lens. When the shutter was closed each time the freezer door was opened, collimator icing was prevented.

This setup was used to investigate two- and three-dimensional swimming behavior of *C. psychrerythraea*. This organism has been previously reported to show motility down to at least −10° C., in experiments conducted with a light microscope inside a temperature-controlled cold room [30]. Motility stopped at −15° C., with only Brownian motion apparent. In experiments, because the achievable freezer settings of −11 to −26° C. were at the lower limits of the range of interest, a resistive heat stage was used to ramp the sample chambers across a range desired target temperatures from 0° C. down to the point where freezing occurred. A thermocouple on the stage and a resistance temperature detector (RTD) inside the sample chamber measured the stage and sample temperature, respectively.

FIGS. 3(a)-3(c) show hologram, phase, and intensity images of a *C. psychrerythraea* culture in growth medium and 10% glycerol at −16° C. The images were of sufficient quality to permit thresholding and object tracking using MOSAIC [31]. FIGS. 3(d)-3(f) show 2-dimensional tracks of bacteria at +6, −13, and −15° C. It can be readily seen that the cells were highly active at +6° C., with characteristic darting and reversing motions. At −13° C., most cells did not show motility, though a few retained very fast swimming. By −15° C., only Brownian motion and slight sample drift could be observed.

Thus, the new, compact, twin-beam design for off-axis digital holographic microscopy presented above provides a robust instrument with diffraction-limited imaging performance, and is able to resolve single bacterial cells. It is routinely used in the laboratory environment to measure microscopic bacteria, and is applicable to cultured mammalian cells (although not demonstrated here).

B. Multiple Wavelength Embodiments

Figure 4A:
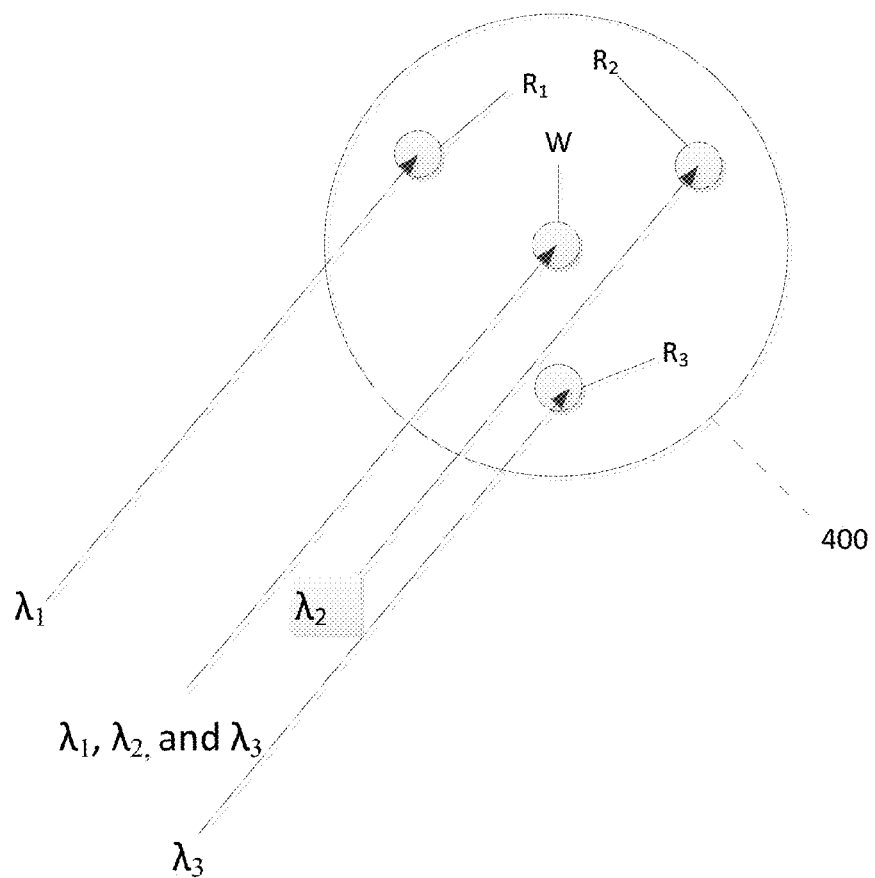
FIG. 4(a) and FIG. 4(b) illustrate sample mounts according to one or more embodiments of the invention.

The instrument of FIG. 1(a)-(c) can be modified to use multiple wavelengths. FIG. 4(a) illustrates an insert/mount/holder/chamber 400 for mounting the sample and reference in the instrument of FIG. 1(a)-(c) when the sample and reference are irradiated with beams having different wavelengths $\lambda_1$, $\lambda_2$, and $\lambda_3$. The mount 400 comprises a sample window W placed in front of the sample and defining the area of the sample irradiated by the electromagnetic radiation 114a, and a plurality of reference windows $R_1$, $R_2$ and $R_3$ are placed in front of each of a plurality of reference areas to define the areas of the references irradiated by the electromagnetic radiation 114b. While the sample window W exposes the sample to a beam comprising multiple wavelengths $\lambda_1$, $\lambda_2$, and $\lambda_3$, each of the reference windows $R_1$, $R_2$ and $R_3$ exposes each of the references to one of the different wavelengths $\lambda_1$, $\lambda_2$, and $\lambda_3$, respectively.

Figure 4B:
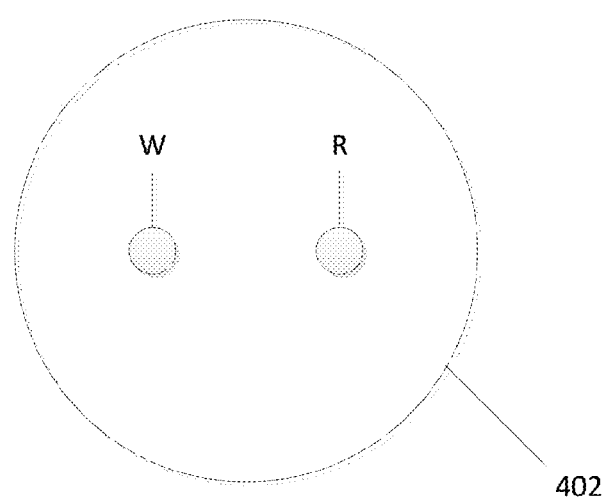

FIG. 4(b) illustrates a sample mount 402 comprising a sample window W and reference window R.

Thus, one or more embodiments of the invention can perform microscopy using a single wavelength, multiple static wavelengths, or multiple tunable wavelengths.

C. Process Steps

Figure 5:
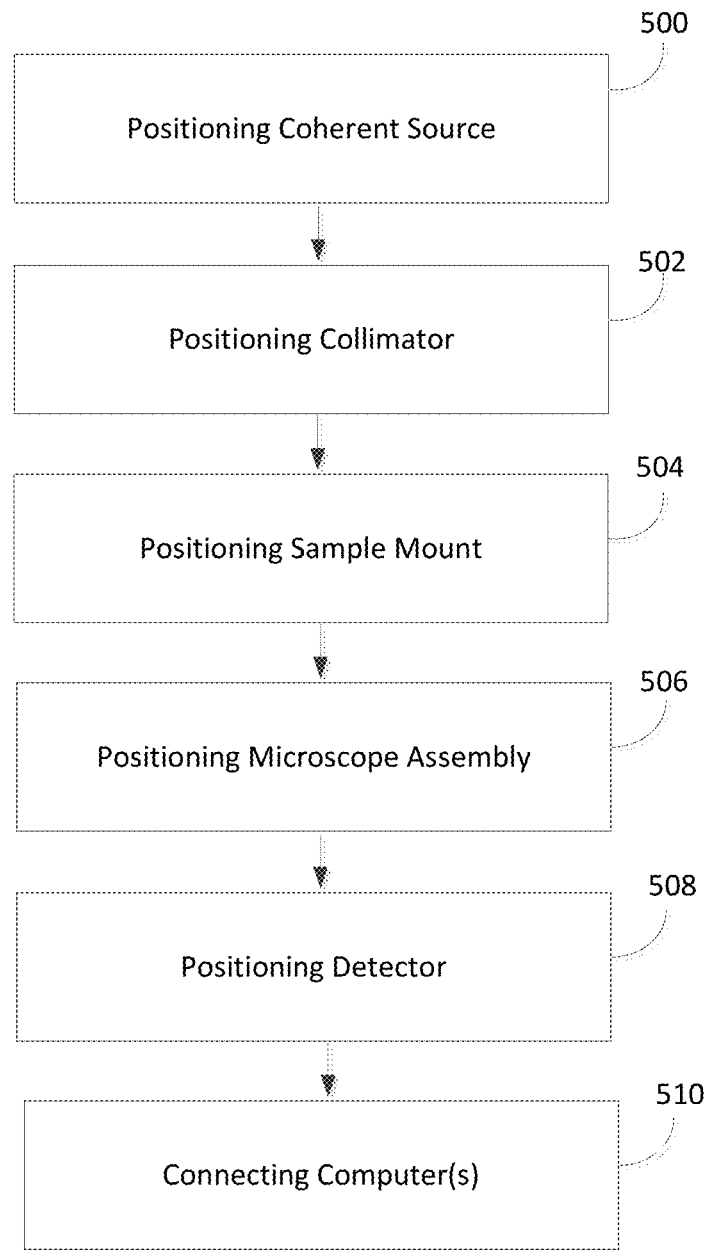
FIG. 5 is flowchart illustrating a method of fabricating an imaging system according to one or more embodiments of the invention.

FIG. 5 illustrates a method of fabricating an imaging system comprising an (e.g., common mode) digital holographic microscope (referring also to FIG. 1(a)). The method can comprise the following steps.

Block 500 represents positioning one or more coherent electromagnetic radiation sources 100 (e.g., laser) emitting electromagnetic radiation 112 (e.g., visible or near infrared wavelengths).

Block 502 represents positioning a collimator 110 to collimate the electromagnetic radiation 110, to form collimated electromagnetic radiation 114a-b (e.g., a collimated beam propagating along a z-axis and having a wavefront in an x-y plane, where x, y, and z are Cartesian coordinates).

Block 504 represents mounting a sample (spec.) and one or more references (ref.) on/in a sample mount/holder/chamber, and positioning the sample mount to intercept the collimated electromagnetic radiation 114a-b, wherein the sample (spec.) interacts with the collimated electromagnetic radiation 114a to form sample electromagnetic radiation 116, and the references (ref) interact with the collimated electromagnetic radiation 114b to form reference electromagnetic radiation 118.

The references can be positioned at a different x coordinate and/or a different y coordinate as compared to the sample (e.g., laterally from the sample).

In one or more embodiments, the sample can comprise one or more biological cells in a liquid and the reference can comprise the liquid (e.g., without the biological cells).

In one or more embodiments, the imaging system is configured to image the sample in a transmission/transmissive geometry, wherein the sample transmits at least some of the collimated electromagnetic radiation 114a to form the sample electromagnetic radiation 116 (as illustrated in FIG. 1(a)).

In one or more embodiments, the imaging system is configured to image the sample in a reflection/reflective geometry, wherein the sample reflects at least some of the collimated electromagnetic radiation 114a to form the sample electromagnetic radiation.

In one or more embodiments, the electromagnetic radiation 112 comprises multiple (fixed or scanned) wavelengths, and the sample mount comprises a sample window W (transmitting the multiple wavelengths $\lambda_1$, $\lambda_2$, $\lambda_3$, to the sample) and a plurality of reference windows $R_1$, $R_2$, $R_3$ (each of the reference windows transmitting a different one of the wavelengths $\lambda_1$, $\lambda_2$, $\lambda_3$ to one of the plurality of the references).

Block 506 represents positioning an assembly/microscope assembly for transmitting at least some of the sample electromagnetic radiation and reference electromagnetic radiation to an imaging array.

For example, the step can comprise positioning a microscope lens assembly comprising a first lens (e.g., objective 104a), a second lens (e.g., objective 104b), and a relay lens 106. The first lens 104a and the second lens 104b (e.g., identical to the first lens 104a) can be positioned at a distance $f_o$ from the sample and reference, respectively (where $f_o$ is the focal distance of the first lens 104a and second lens 104b). The first lens 104a transmits at least some of the sample electromagnetic radiation 118 to the relay lens 106. The second lens 104b transmits at least some of the reference electromagnetic radiation 120 to the relay lens 106. In this way, at least a portion of the sample electromagnetic radiation 124 (collected by and transmitted through the first lens 104a, and then intercepted and transmitted by the relay lens 106) interferes with the at least a portion of the reference electromagnetic radiation 126 (collected by and transmitted through the second lens 104b and then intercepted by and transmitted by the relay lens 106) to form a fringe/interference pattern on the detector (CCD). The fringe spacing/frequency of the interference/fringe pattern is determined by the angle of incidence of the sample electromagnetic radiation 124 and reference electromagnetic radiation 126 on the detector (CCD) (in turn determined by the angle θ, between the sample electromagnetic radiation 124 and reference electromagnetic radiation 126, at which the relay lens 106 directs or combines the sample and reference electromagnetic radiation 124, 126 onto the detector to create the fringe pattern).

Figure 8A:
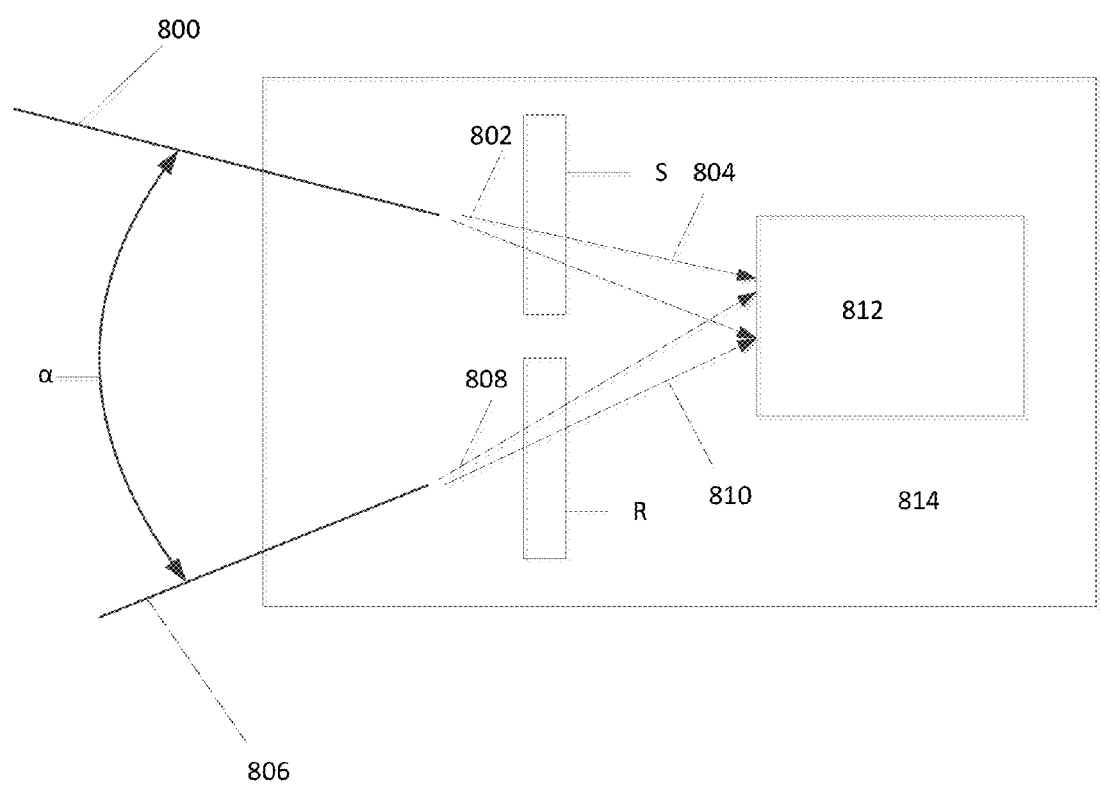
FIG. 8a illustrates a lens-less imaging system according to one or more embodiments of the invention.

For example, step can comprise positioning a reflective objective and relay mirror in a reflective system, so that the sample and reference electromagnetic radiation are reflected from the reflective objective and then the relay mirror, onto the detector, where the sample and reference electromagnetic radiation interfere to form an interference pattern, as illustrated in FIG. 8b.

In the case of the electromagnetic radiation 124, 126 comprising multiple wavelengths (fixed or scanned/scanning multi-wavelengths), the fringe pattern will comprise multiple overlaid fringe patterns at different angles.

The first lens 104a and the second lens 104b can be supported on a lens mount positioned between the sample mount and the relay lens 106. A center of the first lens and a center of the second lens can be equidistant from an optical axis passing through a center of the relay lens. A center of the sample window and a center of the reference window can also be equidistant from the optical axis of the relay lens. The first lens 104a and second lens 104b can be co-mounted on the lens mount such that both the first lens 104a and the second lens 104b move together as a unit under thermal bending/stress. In one or more embodiments, lateral thermal motion of the sample and/or relay lens relative to the remainder of the imaging system only laterally shifts the fringe pattern on the detector and does not affect the image.

In one or more embodiments, the optical path length from the center of the sample window (W in FIG. 4(a) and FIG. 4(b)) to the center of the detector is identical (e.g., to within a coherence length of the electromagnetic radiation) to the optical path length from the center of each of the reference windows (e.g., $R_1$ or R in FIG. 4(a) and FIG. 4(b)) to the center of the detector (the path along the dashed rays in FIG. 1(a)). The optical path length is the sum $\Sigma t \cdot n(\lambda)$, wherein t is a thickness and $n(\lambda)$ is the refractive index of each optical element inside the length considered, and $n(\lambda)$ indicates the refractive index is a function of the electromagnetic radiation passing through the optical element. In addition, the optical path length from the output O of the laser to the center of the sample window W can be identical (e.g., to within a coherence length of the electromagnetic radiation) to the optical path length from the output of the laser O to the center(s) of the reference window(s) (e.g. $R_1$ or R in FIG. 4(a) and FIG. 4(b)).

The source 100, collimator 108, sample, references, objectives 104a-104b, relay lens 106, and/or detector (CCD) can be fixed/positioned in the imaging system, and/or the objectives 104a-104b can be sufficiently identical, such that the above optical path length requirements are met.

The sample mount, the first lens 104a, and the second lens 104b, can be positioned such that the portion of the sample electromagnetic radiation 120 comprises a first straight line trajectory from the sample (spec.) to the relay lens 106 and passing through a center of the first lens 104a, the portion of the reference electromagnetic radiation 122 comprises a second straight line trajectory from the reference to the relay lens 106 and passing through a center of the second lens 104b, and the first straight line trajectory and the second straight line trajectory are parallel.

Block 508 represents positioning a detector to detect and image the fringe/interference pattern. The detector can output one or more signals representing the fringe pattern.

Block 510 represents providing/connecting one or more computers or processors that use the signals (or fringe pattern or image of the fringe pattern) to numerically/digitally construct or compute an image of the sample. The one or more computers can use the fringe pattern to compute one or more electric fields (e.g., phase and/or amplitude of the fields) at the sample.

Figure 6:
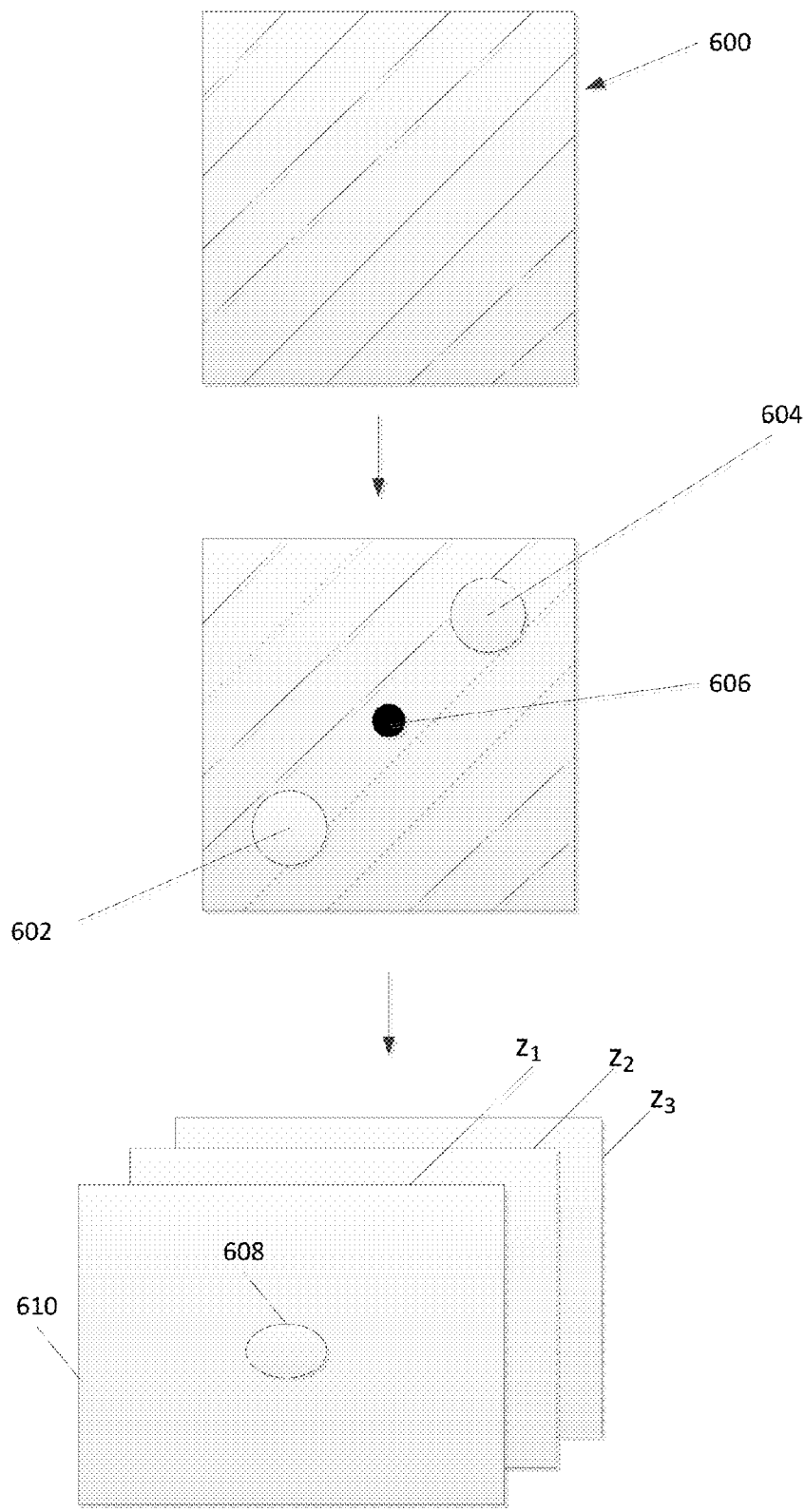
FIG. 6 illustrates reconstructing an image from a raw hologram captured using the imaging system according to one or more embodiments of the invention.

FIG. 6 illustrates a method for reconstructing an image from the raw hologram (fringe pattern 600) imaged on the camera. The computers calculate a two dimensional fast Fourier transform (2D-FFT) of the fringe pattern 600 to form a pattern comprising a real spot/term 602, a virtual spot/term 604, and a DC term 604. The spots 602 and 604 are shaped/defined by the pupils P. The computer/user can then select a virtual term 604 and/or real term 602 and the computer can multiply the selected virtual and/or real term 602/604 by a propagator (describing how the field propagates from the sample to the camera, e.g., using the Fresnel Huygens principle) to obtain a propagated term. The propagated term can be subjected to an inverse 2D FFT to obtain the image 608 (e.g., static or moving/video image) of the sample. The propagator can be applied at different times (e.g., to re-create moving images 608). For example, one image frame 610 can be obtained for each time point to observe changes/variation in the sample volume. In this way, the shape of the target (e.g., biological cell 608) and/or position of the target in the volume as a function of time can be observed/traced/tracked (each frame showing a different position $z_1$, $z_2$, $z_3$ of the target).

The imaging system can simultaneously have submicron resolution and high field/depth of view. The number of pixels in the detector array (Charge Coupled Device (CCD)) can be increased to improve resolution. The imaging system can observe phase variations down to ~1-5 nanometers.

The image can have a resolution of less than 1 micrometer over a 0.4 mm×0.4 mm×0.4 mm volume of the sample.

Positions of the collimator 110, the sample mount, the sample (spec.), the references (ref.), the first lens 104a, the second lens 104b, and the relay lens 106 can be (e.g., fixed) such that:

a resolution of the image does not change when a temperature, of an environment in physical contact the imaging system, is reduced from 20° C. to −26° C., without adjustment of the positions (of the collimator, the mount, the first lens, and the second lens, and the relay lens)—i.e., after the temperature is changed, the imaging system does not have to be adjusted to achieve the same resolution as compared to before the temperature change); and/or the imaging system can be transported to (e.g., by foot, aircraft, boat, or vehicle) and operated in a marine environment or an arctic environment in physical contact with the imaging system, without adjustment of positions (of the collimator, the mount, the first lens, and the second lens, and the relay lens)—i.e., after the imaging system is assembled and moved from the assembly site to the field location (e.g., Greenland), the imaging system does not have to be adjusted to achieve the same resolution as achieved at the assembly location.

Thus, one or more embodiments of the imaging system do not require adjustment due to environmental conditions that do not cause catastrophic failure (unlike the Mach Zehnder interferometer, for example, which does require adjustment after environmental conditions are changed). Thus, one or more embodiments of the invention may not require adjustment mechanisms. Moreover, one or more embodiments of the imaging system can be mirror-less and/or without beamsplitters (e.g., such that the sample and the reference are irradiated by a single, common, and unsplit region of the collimated beam).

D. Lens-Less Imaging System

Figure 7:
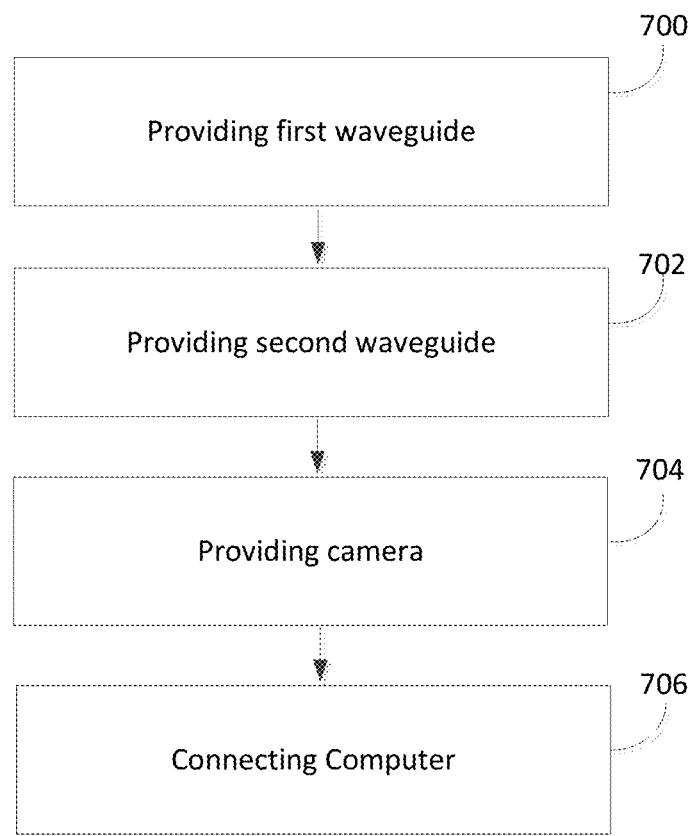
FIG. 7 illustrates a method of fabricating a lens-less imaging system according to one or more embodiments of the invention.

FIG. 7 is a flowchart illustrating a method of fabricating a lens-less imaging system as illustrated in FIG. 8. The method can comprise the following steps.

Block 700 represents providing a first single mode waveguide (e.g., single mode optical fiber 800) guiding first coherent electromagnetic radiation 802 onto a sample S, wherein the sample transmits at least some of the first coherent electromagnetic radiation 802 to form sample electromagnetic radiation 804.

Block 702 represents providing a second single mode waveguide (e.g., second optical fiber 806) fixed at an angle α with respect to the first single mode waveguide 800, the second single mode waveguide guiding second coherent electromagnetic radiation 808 onto a reference R, the reference transmitting the second coherent electromagnetic radiation 808 to form reference electromagnetic radiation 810.

Block 704 represents providing a camera 812 positioned to detect a fringe/interference pattern formed by the reference electromagnetic radiation 810 and the sample electromagnetic radiation 804 interfering on the camera. The angle between a the fibers 800 and 806 creates the fringe pattern on the camera.

Block 706 represents providing a computer that process the fringe pattern to reconstruct the image of the sample using software (e.g., as illustrated in FIG. 6).

The lens-less device can be compact and swallowable. The single mode fibers, sample, and reference can be mounted/integrated on a substrate 814 (e.g., and held in etched holes in the substrate). The substrate can comprise a biocompatible material, such as glass or titanium, for example.

E. Reflective Geometry

FIG. 8b illustrates a digital holographic microscope having a reflective geometry, comprising a sample mount 816 positioned such that a sample mounted on the sample mount interacts with the collimated electromagnetic radiation 818 to form sample electromagnetic radiation 820, and one or more references mounted on the sample mount 816 interact with the collimated electromagnetic radiation 818 to form reference electromagnetic radiation 822. FIG. 8b further illustrates the microscope further includes a reflective objective 824 (comprising primary mirror 826 and secondary mirror 828) and a relay mirror 830, positioned such that at least a portion of the sample electromagnetic radiation 820 and at least a portion of the reference electromagnetic radiation 822 are reflected from the secondary mirror 828, then the primary mirror 826, and then the relay mirror 830, to an imaging array 832. The portion of the sample electromagnetic radiation 820 and the portion of the reference electromagnetic radiation 822 are directed by reflection from the relay mirror 830 (off-axis parabolic (OAP) mirror) onto the imaging array 828 (e.g., at an angle with respect to each other) so that the sample electromagnetic radiation 820 and the reference electromagnetic radiation 822 interfere to form an interference pattern on the imaging array 832. One or more computers can numerically/digitally construct/compute an image of the sample from the interference pattern detected by the imaging array 832 (e.g., CCD) as described above. As described above, the collimated electromagnetic radiation 818 can be formed by collimating electromagnetic radiation from a light source 100 using a collimator 110. Also shown is a pupil/aperture 834. The electromagnetic radiation 818, 820, 822 can comprise single or multiple (e.g., static, tunable) wavelengths, as described above. The primary mirror 826 and secondary mirror 828 are positioned to image the sample to infinity. The imaging array 832 is positioned at a distance $f_{OAP}$ from the relay mirror (OAP) 830, where $f_{OAP}$ is the focal length of the relay mirror (OAP) 830.

F. Applications

Digital holographic microscopy for field microbiological studies requires instrumentation that is simple to assemble and align, and simple and robust to operate. The compact, twin-beam system presented here addresses these factors while also remaining inexpensive. These advantages are traded for a physically constrained sample volume, as well as a fixed fringe spacing at the sensor. However, modest engineering of sample chambers ensured routine operability for most applications. Likewise, no instrumental degradation was observed from fixed fringes and one or more embodiments of the invention can rely upon their stability for quick, repeatable and stable alignment as the optimal off-axis carrier frequency is a fixed once magnification, lateral resolution and detector size are set. For the first time, the image quality advantage of off-axis holography is combined with the compactness and robustness of in-line single-path designs [25,28]. In this regard, one or more embodiments of this "coherent" design are also readily compatible with reduced-coherence sources for applications where the best image quality (reduced background noise) is required. Because of these advantages, this architecture should find wide use in both the laboratory and field applications.

Biological applications of the imaging system include cell and developmental biology, marine biology, and zoology. One or more embodiments of the imaging system can be used to screen, identify, and/or image cells in a liquid or flowing through channels.

One or more embodiments of the imaging system can be used as a medical diagnostic, e.g., to study/diagnose/image stomach ulcers (e.g., *H. pylori* bacteria cells), intestinal diseases (e.g., caused by *Giardia*) and/or cancer (e.g., colon cancer, skin cancer). In one or more embodiments, the imaging system can be swallowed (e.g., the lens-less embodiment) to image inside a human/animal body.

The image(s) provided by the imaging system can be used to measure surface roughness, phase masks, and characterize the quality of microlithography, for example. One or more embodiments of the invention can be used to perform quantitative phase imaging.

One or more embodiments of the instruments described herein have direct applicability to the detection of life in the universe. A microscopic image of a species swimming in a liquid environment would provide irrefutable evidence of life outside Earth. In one or more embodiments, the instrument has no moving parts, yet allows scientists to image in three dimensions (3D) and in time. This type of robust instrument can be used for a future mission to explore the moons with known liquid water such as Europa and Enceladus.

G. Advantages and Improvements

Recent advances in digital technologies, such as high-speed computers and large-format digital imagers, have led to a burgeoning interest in the science and engineering of digital holographic microscopy (DHM).

Previous digital holographic microscopes have been implemented as optical interferometers. The optical interferometers have two arms: one arm for the 'reference' beam, and the other for the 'science' beam. However, interferometers are very sensitive instruments and subject to mechanical and thermal misalignment and sensitivity to vibration. They are also large, open optical architectures. And when implemented with beamsplitter elements, they are not photon efficient.

The novel solution according to one or more embodiments of the invention has designed and provided a system such that many of the optics between science and reference arms are common. This means they co-propagate along the same beam path and share the same optical elements. This leads to a system that is: simple, small, and insensitive to mechanical misalignment including vibration. It is also enclosed making it sealed from dust and dirt as well as stray light.

In one or more embodiments, the system comprises of: 1) a single fiber collimated light source which provides illumination for both the 'science' and 'reference' arms, 2) a pair of small, microscope objectives located side-by side, and illuminated by the common beam, 3) a relay lens whose center is between the two objectives, and 4) a focal plane element where the signal is measured. This new design: 1) removes two beamsplitters from the canonical interferometer implementation (thereby saving light), 2) provides co-propagating beam paths which makes the system insensitive to opto/mechanical disturbances, 3) renders the system light, compact, and robust (which makes it field-deployable), 4) uses fewer components and is easier to assemble (making it easier to fabricate), and 5) is intrinsically coherent which means the 'science' and 'reference' beams will always combine interferometrically.

Thus, one or more embodiments of the invention provide a novel off-axis DHM, based on a twin-beam optical design, which avoids the limitations of prior systems, and provides many advantages, including compactness, intrinsic stability, robustness against misalignment, ease of use, and cost. These advantages are traded for a physically constrained sample volume, as well as a fixed fringe spacing. The first trade is not overly restrictive for most applications, and the latter provides for a pre-set assembly alignment that optimizes the spatial frequency sampling. Moreover, the new design according to one or more embodiments of the invention supports use in both routine laboratory settings as well as extreme environments without any sacrifice in performance, enabling ready observation of microbial species in the field. The instrument design described in detail here has been demonstrated to achieve bacterial video imaging at sub-micrometer resolution at temperatures down to −15° C. Testing of the apparatus in below freezing conditions showed that optical performance was unchanged as long as condensation was prevented (an input shutter aids in shielding the condenser lens from condensation during rapid temperature and humidity changes). This architecture can be used as a fieldable unit for in situ observations.

H. Hardware and Software Environment

Figure 9:
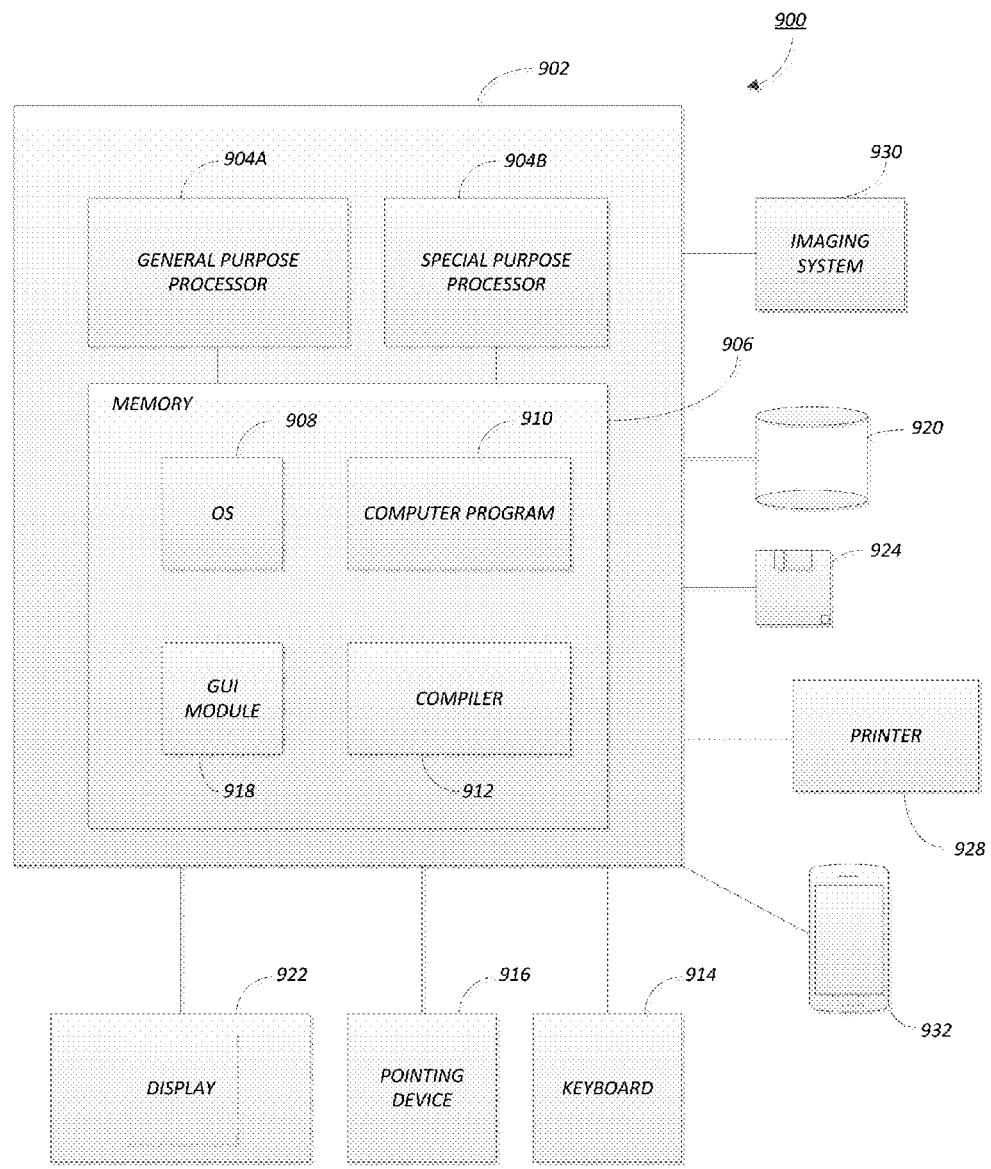
FIG. 9 is an exemplary hardware and software environment used to implement one or more embodiments of the invention.

FIG. 9 is an exemplary hardware and software environment 900 used to implement one or more embodiments of the invention. The hardware and software environment includes a computer 902 and may include peripherals. Computer 902 may be a user/client computer, server computer, or may be a database computer. The computer 902 comprises a general purpose hardware processor 904A and/or a special purpose hardware processor 904B (hereinafter alternatively collectively referred to as processor 904) and a memory 906, such as random access memory (RAM). The computer 902 may be coupled to, and/or integrated with, other devices, including input/output (I/O) devices such as a keyboard 914, a cursor control device 916 (e.g., a mouse, a pointing device, pen and tablet, touch screen, multi-touch device, etc.) and a printer 928. In one or more embodiments, computer 902 may be coupled to, or may comprise, a portable or media viewing/listening device 932 (e.g., an MP3 player, IPOD, NOOK, portable digital video player, cellular device, personal digital assistant, etc.). In yet another embodiment, the computer 902 may comprise a multi-touch device, mobile phone, gaming system, internet enabled television, television set top box, or other internet enabled device executing on various platforms and operating systems.

In one embodiment, the computer 902 operates by the general purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908, to provide output and results.

Output/results may be presented on the display 922 or provided to another device for presentation or further processing or action. In one embodiment, the display 922 comprises a liquid crystal display (LCD) having a plurality of separately addressable liquid crystals. Alternatively, the display 922 may comprise a light emitting diode (LED) display having clusters of red, green and blue diodes driven together to form full-color pixels. Each liquid crystal or pixel of the display 922 changes to an opaque or translucent state to form a part of the image on the display in response to the data or information generated by the processor 904 from the application of the instructions of the computer program 910 and/or operating system 908 to the input and commands. The image may be provided through a graphical user interface (GUI) module 918. Although the GUI module 918 is depicted as a separate module, the instructions performing the GUI functions can be resident or distributed in the operating system 908, the computer program 910, or implemented with special purpose memory and processors.

In one or more embodiments, the display 922 is integrated with/into the computer 902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 902 according to the computer program 910 instructions may be implemented in a special purpose processor 904B. In this embodiment, the some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program 910 instructions. In one embodiment, the special purpose processor 904B is an application specific integrated circuit (ASIC).

The computer 902 may also implement a compiler 912 that allows an application or computer program 910 written in a programming language to be translated into processor 904 readable code. Alternatively, the compiler 912 may be an interpreter that executes instructions/source code directly, translates source code into an intermediate representation that is executed, or that executes stored precompiled code. After completion, the application or computer program 910 accesses and manipulates data accepted from I/O devices and stored in the memory 906 of the computer 902 using the relationships and logic that were generated using the compiler 912.

The computer 902 also optionally comprises an external communication device such as a modem, satellite link, Ethernet card, or other device for accepting input from, and providing output to, other computers 902.

In one embodiment, instructions implementing the operating system 908, the computer program 910, and the compiler 912 are tangibly embodied in a non-transitory computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of computer program 910 instructions which, when accessed, read and executed by the computer 902, cause the computer 902 to perform the steps necessary to implement and/or use the present invention or to load the program of instructions into a memory 906, thus creating a special purpose data structure causing the computer 902 to operate as a specially programmed computer executing the method steps described herein (e.g., numerical/digital construction of the image from the interference pattern, e.g., as illustrated in FIG. 6). Computer program 910 and/or operating instructions may also be tangibly embodied in memory 906 and/or data communications devices, thereby making a computer program product or article of manufacture according to the invention. As such, the terms "article of manufacture," "program storage device," and "computer program product," as used herein, are intended to encompass a computer program accessible from any computer readable device or media. In one or more embodiments, computer 902 may be coupled to, or may comprise, or be integrated in, an imaging system 930 (e.g., as illustrated in FIG. 1(*a*)-(*e*) or FIG. 5).

Of course, those skilled in the art will recognize that any combination of the above components, or any number of different components, peripherals, and other devices, may be used with the computer 902.

Figure 10:
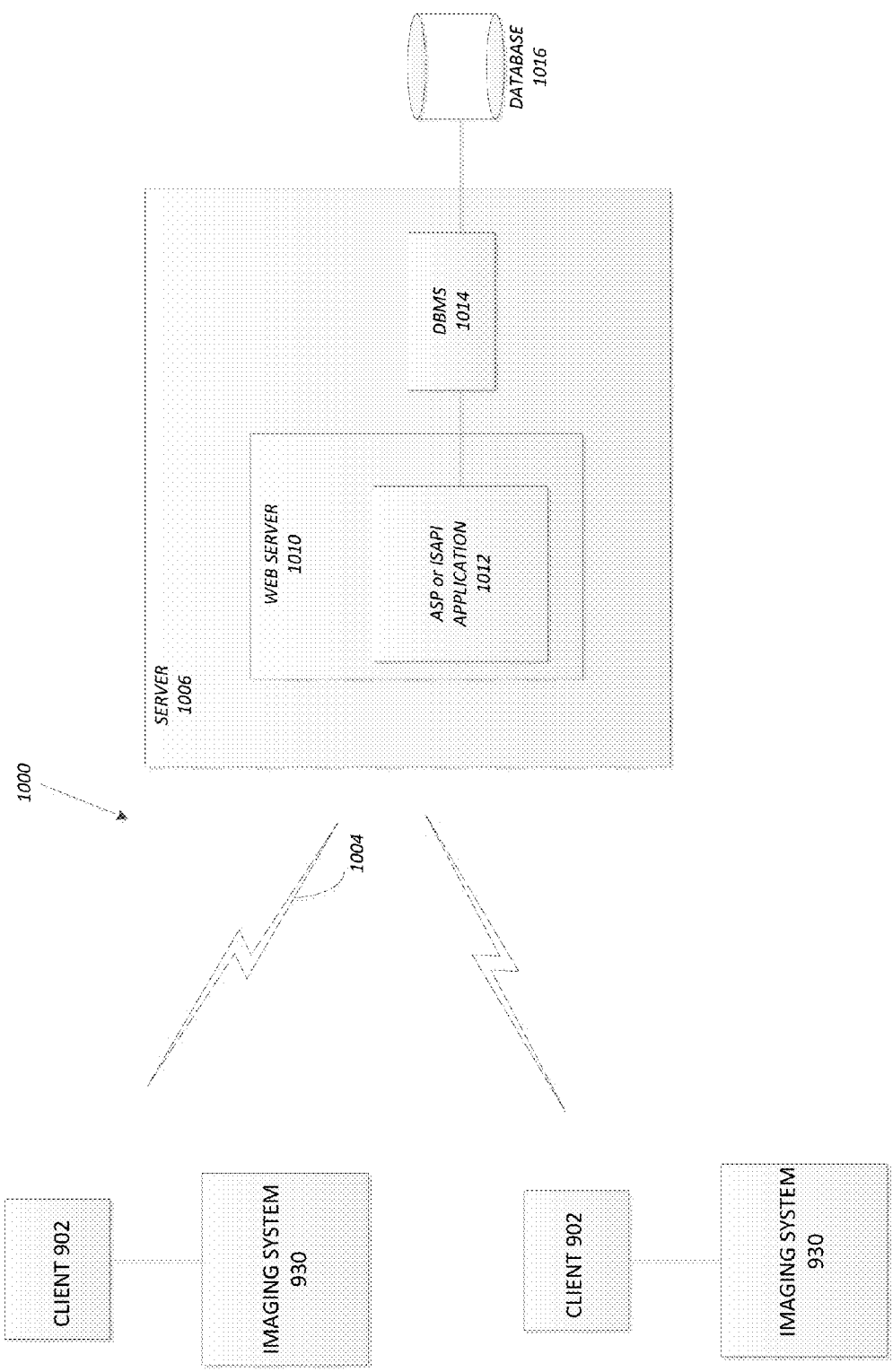
FIG. 10 schematically illustrates a typical distributed/cloud-based computer system using a network to connect client computers to server computers, according to one or more embodiments of the invention.

FIG. 10 schematically illustrates a typical distributed/cloud-based computer system 1000 using a network 1004 to connect client computers 902 and imaging system 930 to server computers 1006. A typical combination of resources may include a network 1004 comprising the Internet, LANs (local area networks), WANs (wide area networks), SNA (systems network architecture) networks, or the like, clients 1002 that are personal computers or workstations (as set forth in FIG. 9), and servers 1006 that are personal computers, workstations, minicomputers, or mainframes (as set forth in FIG. 9). However, it may be noted that different networks such as a cellular network (e.g., GSM [global system for mobile communications] or otherwise), a satellite based network, or any other type of network may be used to connect clients 1002 and servers 1006 in accordance with embodiments of the invention.

A network 1004 such as the Internet connects clients 1002 to server computers 1006. Network 1004 may utilize ethernet, coaxial cable, wireless communications, radio frequency (RF), etc. to connect and provide the communication between clients 1002 and servers 1006. Further, in a cloud-based computing system, resources (e.g., storage, processors, applications, memory, infrastructure, etc.) in clients 1002 and server computers 1006 may be shared by clients 1002, server computers 1006, and users across one or more networks. Resources may be shared by multiple users and can be dynamically reallocated per demand. In this regard, cloud computing may be referred to as a model for enabling access to a shared pool of configurable computing resources.

Clients 1002 may execute a client application or web browser and communicate with server computers 1006 executing web servers 1010. Such a web browser is typically a program such as MICROSOFT INTERNET EXPLORER, MOZILLA FIREFOX, OPERA, APPLE SAFARI, GOOGLE CHROME, etc. Further, the software executing on clients 1002 may be downloaded from server computer 1006 to client computers 1002 and installed as a plug-in or ACTIVEX control of a web browser. Accordingly, clients 1002 may utilize ACTIVEX components/component object model (COM) or distributed COM (DCOM) components to provide a user interface on a display of client 1002. The web server 1010 is typically a program such as MICROSOFT'S INTERNET INFORMATION SERVER.

Web server 1010 may host an Active Server Page (ASP) or Internet Server Application Programming Interface (ISAPI) application 1012, which may be executing scripts. The scripts invoke objects that execute business logic (referred to as business objects). The business objects then manipulate data in database 1016 through a database management system (DBMS) 1014. Alternatively, database 1016 may be part of, or connected directly to, client 1002 instead of communicating/obtaining the information from database 1016 across network 1004. When a developer encapsulates the business functionality into objects, the system may be referred to as a component object model (COM) system. Accordingly, the scripts executing on web server 1010 (and/or application 1012) invoke COM objects that implement the business logic. Further, server 1006 may utilize MICROSOFT'S TRANSACTION SERVER (MTS) to access required data stored in database 1016 via an interface such as ADO (Active Data Objects), OLE DB (Object Linking and Embedding DataBase), or ODBC (Open DataBase Connectivity).

Generally, these components 1000-1016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1002 and 1006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1002 and 1006.

REFERENCES

The following references are incorporated by reference herein.
1. C. Knox, "Holographic microscopy as a technique for recording dynamic microscopic subjects," Science 153 (3739), 989-990 (1966).
2. A. Chengala, M. Hondzo, and J. Sheng, "Microalga propels along voracity direction in a shear flow," Phys. Rev. E, 87, 052704 (2013).
3. J. Sheng, E. Malkiel, J. Katz, J. Adolf, R. Belas, and A. R. Place, "Digital holographic microscopy reveals prey-induced changes in swimming behavior of predatory dinoflagellates," PNAS 104(44), 17512-17517 (2007).
4. J. Sheng, E. Malkiel, J. Katz, J. E. Adolf, and A. R. Place, "A dinoflagellate exploits toxins to immobilize prey prior to ingestion," PNAS 107(5), 2082-2087 (2010).
5. S. M. Vater, J. Finlay, M. E. Callow, J. A. Callow, T. Ederth, B. Liedberg, M. Grunze, and A. Rosenhahn, "Holographic microscopy provides new insights into the settlement of zoospores of the green alga Ulva linza on cationic oligopeptide surfaces," Biofouling 31(2), 229-239 (2015).
6. N. Pavillon, J. Kuhn, C. Moratal, P. Jourdain, C. Depeursinge, P. J. Magistretti, and P. Marquet, "Early cell death detection with digital holographic microscopy," PLoS ONE 7, e0030912 (2012).
7. P. Marquet, B. Rappaz, P. J. Magistretti, E. Cuche, Y. Emery, T. Colomb, and C. Depeursinge, "Digital holographic microscopy: a noninvasive contrast imaging technique allowing quantitative visualization of living cells with subwavelength axial accuracy," Optics letters 30(5), 468-470 (2005).
8. B. Kemper, D. Carl, J. Schnekenburger, I. Bredebusch, M. Schafer, W. Domschke, and G. von Bally, "Investigation of living pancreas tumor cells by digital holographic microscopy," Journal of biomedical optics 11, 034005 (2006).
9. P. Jourdain, N. Pavillon, C. Moratal, D. Boss, B. Rappaz, C. Depeursinge, P. Marquet, and P. J. Magistretti, "Determination of transmembrane water fluxes in neurons elicited by glutamate ionotropic receptors and by the cotransporters KCC2 and NKCC1: a digital holographic microscopy study," The Journal of Neuroscience 31(33), 11846-11854 (2011).
10. H. Janeckova, P. Vesely, and R. Chmelik, "Proving tumour cells by acute nutritional/energy deprivation as a survival threat: a task for microscopy," Anticancer research 29(6), 2339-2345 (2009).
11. M. Falck Miniotis, A. Mukwaya, and A. Gjorloff Wingren, "Digital holographic microscopy for non-invasive monitoring of cell cycle arrest in L929 cells," PLoS one 9, e106546 (2014).

12. T.-W. Su, L. Xue, and A. Ozcan, "High-throughput lensfree 3D tracking of human sperms reveals rare statistics of helical trajectories," PNAS 109(40), 16018-16022 (2012).
13. T. Fenchel, "Microbial behavior in a heterogeneous world," Science 296(5570), 1068-1071 (2002).
14. T. Fenchel, "Eppur si muove: many water column bacteria are motile," Aquatic Microbial Ecology 24(2), 197-201 (2001).
15. J. G. Mitchell, and K. Kogure, "Bacterial motility: links to the environment and a driving force for microbial physics," FEMS microbiology ecology 55(1), 3-16 (2006).
16. E. M. Purcell, "Life at low Reynolds number," Am. J. Phys. 45(1), 3-11 (1977).
17. M. J. Rivera, and D. Y. Sumner, "Unraveling the three-dimensional morphology of archean microbialites," Journal of Paleontology 88(4), 719-726 (2014).
18. U. Schnars, and W. Jüptner, "Direct Recording of Holograms by a CCD Target and Numerical Reconstruction," Applied optics 33(2), 179-181 (1994).
19. U. Schnars, and W. Juptner, "Digital recording and numerical reconstruction of holograms," Measurement science and technology 13(9), R85-R101 (2002).
20. E. Cuche, P. Marquet, and C. Depeursinge, "Simultaneous amplitude-contrast and quantitative phase-contrast microscopy by numerical reconstruction of Fresnel off-axis holograms," Applied optics 38(34), 6994-7001 (1999).
21. E. Cuche, P. Marquet, and C. Depeursinge, "Spatial filtering for zero-order and twin-image elimination in digital off-axis holography," Applied optics 39(23), 4070-4075 (2000).
22. C. Mann, L. Yu, C. M. Lo, and M. Kim, "High-resolution quantitative phase-contrast microscopy by digital holography," Optics Express 13(22), 8693-8698 (2005).
23. F. Zhang, G. Pedrini, and W. Osten, "Reconstruction algorithm for high-numerical-aperture holograms with diffraction-limited resolution," Optics letters 31(11), 1633-1635 (2006).
24. T. Colomb, E. Cuche, F. Charriere, J. Kuhn, N. Aspert, F. Montfort, P. Marquet, and C. Depeursinge, "Automatic procedure for aberration compensation in digital holographic microscopy and applications to specimen shape compensation," Applied optics 45(5), 851-863 (2006).
25. W. Xu, M. H. Jericho, I. A. Meinertzhagen, and H. J. Kreuzer, "Digital in-line holography for biological applications," PNAS 98(20), 11301-11305 (2001).
26. M. Molaei and J. Sheng, "Imaging bacterial 3D motion using digital in-line holographic microscopy and correlation-based de-noising algorithm," Optics Express 22(26), 32119-32137 (2014).
27. I. Yamaguchi, and T. Zhang, "Phase-shifting digital holography," Optics letters 22(16), 1268-1270 (1997).
28. S. K. Jericho, P. Klages, J. Nadeau, E. M. Dumas, M. H. Jerico, and J. J. Kreuzer, "In-line digital holographic microscopy for terrestrial and exobiological research," Planetary and Space Science 58, 701-705 (2010).
29. J. Kuhn, B. Niraula, K. Liewer, J. K. Wallace, E. Serabyn, E. Graff, C. Lindensmith, and J. L. Nadeau, "A Mach-Zehnder digital holographic microscope with submicrometer resolution for imaging and tracking of marine micro-organisms," Review of Scientific Instruments 85(12) (2014).
30. K. Junge, H. Eicken, and J. W. Deming, "Motility of colwellia psychrerythraea strain 34H at subzero temperatures," Appl Environ Microbiol 69(7), 4282-4284 (2003).
31. Y. Gong, and I. F. Sbalzarini, "Image enhancement by gradient distribution specification," Proc. ACCV, 12th Asian Conference on Computer Vision Workshop on Emerging Topics in Image Enhancement and Restoration, w7-p3 (2014).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A digital holographic microscope, comprising:
   at least one coherent electromagnetic radiation source emitting electromagnetic radiation;
   a collimator positioned to collimate the electromagnetic radiation, to form collimated electromagnetic radiation;
   a sample mount positioned such that:
   a sample mounted on the sample mount interacts with the collimated electromagnetic radiation to form sample electromagnetic radiation, and
   one or more references mounted on the sample mount interact with the collimated electromagnetic radiation to form reference electromagnetic radiation; and
   a microscope lens assembly, comprising a first lens separate from a second lens, and a relay lens, positioned such that:
   at least a portion of the sample electromagnetic radiation is transmitted through the first lens, and then the relay lens, forming a real image of the sample on a detector,
   at least a portion of the reference electromagnetic radiation is transmitted through the second lens, and then the relay lens, forming a reference beam spread over pixels on the detector,
   the portion of the sample electromagnetic radiation and the reference beam are directed by the relay lens onto the detector at an angle with respect to each other so as to form an interference pattern on the detector, and
   one or more computers can compute an image of the sample using the real image including the interference pattern detected by the detector.

2. The digital holographic microscope of claim 1, wherein the system is an off-axis digital holographic microscope.

3. The digital holographic microscope of claim 1, wherein the electromagnetic radiation comprises a single wavelength.

4. The digital holographic microscope of claim 1, wherein:
   the one or more references comprise a plurality of references,
   the electromagnetic radiation comprises multiple (fixed or scanned) wavelengths, and the sample mount comprises:
   a sample window transmitting the multiple wavelengths to the sample, and
   a plurality of reference windows, each of the reference windows transmitting a different one of the wavelengths to one of the plurality of the references.

5. The digital holographic microscope of claim 1, wherein:

the imaging system has a transmission geometry such that the first lens and the second lens collect at least some of the sample electromagnetic radiation transmitted through the sample.

6. The digital holographic microscope of claim 1, wherein:
the sample comprises one or more biological cells in a liquid, and
the one or more references each comprise the liquid.

7. The digital holographic microscope of claim 1, wherein the image has a resolution of less than 1 micrometer over a 0.4 mm×0.4 mm×0.4 mm volume of the sample.

8. The digital holographic microscope of claim 1, wherein:
positions of the collimator, the sample mount, the sample, the one or more references, the first lens, the second lens, and the relay lens are such that a resolution of the image does not change when:
a temperature, of an environment in physical contact the imaging system, is reduced from 20° C. to −26° C., without adjustment of the positions.

9. The digital holographic microscope of claim 1, wherein the imaging system is portable to, and operational in, a marine environment or an arctic environment in physical contact with the imaging system, without adjustment of positions of the collimator, the mount, the first lens, the second lens, and the relay lens.

10. The digital holographic microscope of claim 1, wherein the one or more computers compute an amplitude and/or phase of one or more electric fields at the sample.

11. The digital holographic microscope of claim 1, wherein the sample mount, the first lens, and the second lens are positioned such that:
the portion of the sample electromagnetic radiation comprises a first straight line trajectory from the sample to the relay lens and passing through a center of the first lens,
the portion of the reference electromagnetic radiation comprises a second straight line trajectory from the sample to the relay lens and passing through a center of the second lens, and
the first straight line trajectory and the second straight line trajectory are parallel.

12. The digital holographic microscope of claim 11, further comprising:
a sample window placed in front of the sample and defining the area of the sample irradiated by the collimated electromagnetic radiation;
a reference window placed in front of each of the one or more references to define the area of each of the references irradiated by the collimated electromagnetic radiation;
the first lens positioned at a distance $f_o$ from the sample, wherein $f_o$ is a focal distance of the first lens;
the second lens, identical to the first lens, positioned at the distance $f_o$ from the one or more references; and wherein:
an optical path length, from a center of the sample window to a center of the detector, is identical to each optical path length from each center of each reference window to the center of the detector,
an optical path length from an output of the source to the center of the sample window is identical to each optical path length from the output to each center of each reference window, the first lens and second lens are co-mounted on a lens mount such that both the first lens and the second lens move together as a unit under thermal bending, and
a lateral thermal motion of the sample and/or relay lens relative to the remainder of the imaging system only laterally shifts the interference pattern on the detector and does not affect the image.

13. The digital holographic microscope of claim 1, wherein:
the digital holographic microscope does not comprise a beamsplitter and/or a mirror,
the sample and the one or more references are irradiated by a single, common, and unsplit region of the collimated beam, and
a diffraction grating is not positioned between the first and second lenses and the detector.

14. The digital holographic microscope of claim 1, wherein the system is portable without adjustment of the position of the first lens, second lens, and relay lens.

15. The digital holographic microscope of claim 1, wherein the sample mount comprises a first mount for mounting the sample and a second mount for mounting the reference, and the reference beam incident on the detector is nominally collimated.

16. The digital holographic microscope of claim 1, wherein:
the sample mount comprises a first chamber and a second chamber,
the sample in the first chamber interacts with the collimated electromagnetic radiation to form the sample electromagnetic radiation, and
the reference in the second chamber interacts with the collimated electromagnetic radiation to form the reference electromagnetic radiation.

17. The digital holographic microscope of claim 1, wherein the first lens is separated from the second lens by a medium different from the first lens and the second lens.

18. The digital holographic microscope of claim 1, wherein:
the first lens and the second lens are spaced with a spacing s,
the portion of the sample electromagnetic radiation and the portion of the reference electromagnetic radiation are directed by the relay lens onto the detector at an angle $\theta_{fr}=s/f_r$, where $f_r$ is the focal length of the relay lens, and
$\theta_{fr}<\lambda/2\sqrt{2}p$, where p is the pixel edge size.

19. The digital holographic microscope of claim 1, wherein
the first lens and the second lens are spaced with a spacing s,
the first lens and the second lens each have a diameter d and a focal length $f_o$, $s/d \geq 1$,
the relay lens has a focal lens $f_r$,
the first lens and the second lens are each positioned at a distance $f_o+f_r$ from the relay lens, and
the relay lens is positioned at a distance $f_r$ from the detector.

20. The digital holographic microscope of claim 1, wherein the reference beam is spread over all the pixels, thereby illuminating the full detector thus establishing the optical reference for all pixels.

21. A method of fabricating an imaging system, comprising:

providing a sample mount wherein:
  a sample mounted on the sample mount interacts with collimated electromagnetic radiation to form sample electromagnetic radiation, and
  one or more references mounted on the sample mount interact with the collimated electromagnetic radiation to form reference electromagnetic radiation;
providing an assembly comprising a first objective separate from a second objective; and
providing an imaging system, wherein:
  at least a portion of the sample electromagnetic radiation is transmitted through the first objective to the imaging system, the imaging system and the first objective forming a real image of the sample on a sensor,
  at least a portion of the reference electromagnetic radiation is transmitted through the second objective to the imaging system, forming a reference beam spread over all pixels on the sensor and
  the portion of the sample electromagnetic radiation and the portion of the reference electromagnetic radiation combine at the sensor in the imaging system so as to form an interference pattern.

* * * * *